United States Patent
Ge et al.

(10) Patent No.: US 12,234,716 B2
(45) Date of Patent: Feb. 25, 2025

(54) MULTI-POLE RESONANCE BASED THROUGH TUBING CEMENT EVALUATION

(71) Applicant: Halliburton Energy Services, Inc., Houston, TX (US)

(72) Inventors: Yao Ge, Singapore (SG); Ruijia Wang, Singapore (SG); Ho Yin Ma, Singapore (SG); Xiang Wu, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 31 days.

(21) Appl. No.: 17/643,259

(22) Filed: Dec. 8, 2021

(65) Prior Publication Data
US 2023/0175386 A1    Jun. 8, 2023

(51) Int. Cl.
*E21B 47/005*    (2012.01)
*G01V 1/44*    (2006.01)
(Continued)

(52) U.S. Cl.
CPC .............. *E21B 47/005* (2020.05); *G01V 1/44* (2013.01); *G01V 1/48* (2013.01); *G01V 1/50* (2013.01);
(Continued)

(58) Field of Classification Search
CPC .......... E21B 47/005; G01V 1/44; G01V 1/48; G01V 1/50
See application file for complete search history.

(56) References Cited

U.S. PATENT DOCUMENTS 3,583,677 A    6/1971    Phillips
3,914,603 A    10/1975    Paap et al.
(Continued)

FOREIGN PATENT DOCUMENTS

| GB | 2592974 | 9/2021 |
|---|---|---|
| WO | 2019018100 | 1/2019 |
| WO | 2019240952 | 12/2019 |
| WO | 2020222744 | 11/2020 |
| WO | 2023107136 | 6/2023 |

(Continued)

OTHER PUBLICATIONS

PCT Application No. PCT/US2022/070022, International Search Report and Written Opinion, Sep. 21, 2022, 8 pages.
(Continued)

*Primary Examiner* — Isam A Alsomiri
*Assistant Examiner* — Vikas Atmakuri
(74) *Attorney, Agent, or Firm* — DeLizio, Peacock, Lewin & Guerra LLP

(57) ABSTRACT

A method comprising: conveying a downhole tool in a tubing that is positioned in a casing that is positioned to form an annulus between the casing and a wall of a wellbore formed in a subsurface formation, wherein a cement with unknown bonding condition exists in the annulus, wherein the downhole tool includes at least one transmitter and a receiver array physically positioned in different azimuthal directions; emitting, from the at least one transmitter, a first and second acoustic transmissions in a first and second azimuthal directions; detecting, by the receiver array, a first acoustic response and a second acoustic response that is derived from the first and second acoustic transmissions, wherein the second azimuthal direction is orthogonal to the first azimuthal direction; determining a dipole wellbore resonance based on the first and acoustic responses; and evaluating a property of the cement based on the dipole wellbore resonance.

17 Claims, 23 Drawing Sheets

(51) Int. Cl.
*G01V 1/48* (2006.01)
*G01V 1/50* (2006.01)

(52) U.S. Cl.
CPC ............... *G01V 2210/1299* (2013.01); *G01V 2210/1429* (2013.01)

(56) References Cited

U.S. PATENT DOCUMENTS

| | | |
|---|---|---|
| 4,207,961 A | 6/1980 | Kitsunezaki |
| 4,383,591 A | 5/1983 | Ogura |
| 4,649,525 A | 3/1987 | Angona et al. |
| 4,709,357 A | 11/1987 | Maki, Jr. |
| 4,709,362 A | 11/1987 | Cole et al. |
| 4,713,968 A | 12/1987 | Yale et al. |
| 4,783,769 A | 11/1988 | Holzhausen |
| 4,832,148 A | 5/1989 | Becker et al. |
| 4,862,990 A | 9/1989 | Cole et al. |
| 4,874,061 A | 10/1989 | Cole et al. |
| 4,896,303 A | 1/1990 | Leslie et al. |
| 4,951,267 A | 8/1990 | Chang et al. |
| 5,010,527 A | 4/1991 | Mahrer |
| 5,036,496 A | 7/1991 | Rutledge |
| 5,036,945 A | 8/1991 | Hoyle et al. |
| 5,080,189 A | 1/1992 | Cole et al. |
| 5,135,072 A | 8/1992 | Meynier et al. |
| 5,159,578 A | 10/1992 | Lenhardt et al. |
| 5,166,909 A | 11/1992 | Cole et al. |
| 5,168,470 A | 12/1992 | Dennis et al. |
| 5,216,638 A | 6/1993 | Wright |
| 5,266,845 A | 11/1993 | Sakaue |
| 5,357,481 A | 10/1994 | Lester et al. |
| 5,402,392 A | 3/1995 | Lu et al. |
| 5,477,101 A | 12/1995 | Ounadjela |
| 5,544,127 A | 8/1996 | Winkler |
| 5,712,829 A | 1/1998 | Tang et al. |
| 5,763,773 A | 6/1998 | Birchak et al. |
| 5,852,262 A | 12/1998 | Gill et al. |
| 5,859,811 A | 1/1999 | Miller et al. |
| 5,881,310 A | 3/1999 | Airhart et al. |
| 5,924,499 A | 7/1999 | Birchak et al. |
| 6,041,861 A | 3/2000 | Mandal et al. |
| 6,102,152 A | 8/2000 | Masino et al. |
| 6,176,344 B1 | 1/2001 | Lester |
| 6,188,961 B1 | 2/2001 | Mandal |
| 6,464,439 B1 | 10/2002 | Janitzki |
| 6,567,046 B2 | 5/2003 | Taylor et al. |
| 6,772,067 B2 | 8/2004 | Blanch et al. |
| 6,791,891 B1 | 9/2004 | Peng et al. |
| 6,925,031 B2 | 8/2005 | Kriegshauser et al. |
| 6,930,616 B2 | 8/2005 | Tang et al. |
| 7,302,849 B2 | 12/2007 | Segal et al. |
| 7,471,591 B2 | 12/2008 | Tello et al. |
| 7,681,450 B2 | 3/2010 | Bolshakov et al. |
| 8,270,248 B2 | 9/2012 | Hurst et al. |
| 10,233,748 B2 | 3/2019 | Kortam et al. |
| 10,253,615 B2 | 4/2019 | Hunter et al. |
| 10,393,903 B2 | 8/2019 | Jin et al. |
| 10,605,943 B2 * | 3/2020 | Lemarenko ............... G01V 1/48 |
| 10,705,056 B2 | 7/2020 | Lei et al. |
| 10,858,933 B2 | 12/2020 | Bose et al. |
| 11,131,182 B2 * | 9/2021 | Liu ........................ G01N 29/12 |
| 2004/0119471 A1 | 6/2004 | Blanz et al. |
| 2005/0226098 A1 | 10/2005 | Engels et al. |
| 2006/0198243 A1 | 9/2006 | Tang et al. |
| 2006/0233048 A1 | 10/2006 | Froelich et al. |
| 2007/0019506 A1 | 1/2007 | Batakrishna et al. |
| 2007/0140055 A1 | 6/2007 | Tello et al. |
| 2007/0206439 A1 | 9/2007 | Barolak et al. |
| 2008/0112262 A1 | 5/2008 | Tang et al. |
| 2010/0250214 A1 | 9/2010 | Prioul et al. |
| 2011/0019501 A1 | 1/2011 | Market |
| 2011/0261647 A1 * | 10/2011 | Tabarovsky ............. G01V 1/44 367/35 |
| 2012/0176862 A1 | 7/2012 | D'Angelo et al. |
| 2013/0021874 A1 | 1/2013 | Hartog et al. |
| 2013/0070560 A1 * | 3/2013 | Zheng ..................... G01V 1/42 367/25 |
| 2013/0289881 A1 | 10/2013 | Sinha et al. |
| 2014/0056111 A1 | 2/2014 | Vu et al. |
| 2015/0107899 A1 | 4/2015 | Fisher, Jr. et al. |
| 2015/0134257 A1 | 5/2015 | Erge et al. |
| 2015/0198032 A1 | 7/2015 | Sinha |
| 2015/0198732 A1 | 7/2015 | Zeroug et al. |
| 2015/0218930 A1 | 8/2015 | Zeroug et al. |
| 2015/0219780 A1 * | 8/2015 | Zeroug ................. E21B 49/003 702/6 |
| 2015/0338378 A1 | 11/2015 | Lu |
| 2015/0378040 A1 | 12/2015 | Mandal |
| 2016/0033664 A1 * | 2/2016 | Cheng ................... E21B 47/107 73/152.57 |
| 2016/0209539 A1 | 7/2016 | Le Calvez et al. |
| 2017/0058660 A1 | 3/2017 | Hunter et al. |
| 2017/0168179 A1 | 6/2017 | Lemarenko et al. |
| 2017/0199295 A1 | 7/2017 | Mandal |
| 2018/0031723 A1 | 2/2018 | Przebindowska et al. |
| 2018/0149019 A1 * | 5/2018 | Bose ...................... E21B 47/005 |
| 2018/0153205 A1 | 6/2018 | Wu |
| 2018/0328163 A1 | 11/2018 | Hayman et al. |
| 2018/0334901 A1 | 11/2018 | Hou |
| 2019/0018161 A1 | 1/2019 | Wang et al. |
| 2019/0018162 A1 | 1/2019 | Wang et al. |
| 2019/0025452 A1 | 1/2019 | Wang et al. |
| 2019/0129053 A1 | 5/2019 | Wang et al. |
| 2019/0145241 A1 | 5/2019 | Yao et al. |
| 2019/0204468 A1 | 7/2019 | Ge et al. |
| 2019/0211672 A1 | 7/2019 | Jin et al. |
| 2019/0293823 A1 | 9/2019 | Sun et al. |
| 2019/0376380 A1 | 12/2019 | Zhang et al. |
| 2019/0383130 A1 | 12/2019 | Fox et al. |
| 2020/0003924 A1 | 1/2020 | Jin et al. |
| 2020/0033494 A1 * | 1/2020 | Patterson ................ E21B 49/00 |
| 2020/0072036 A1 | 3/2020 | Wang |
| 2020/0088901 A1 | 3/2020 | Quintero et al. |
| 2020/0116007 A1 * | 4/2020 | Mandal ................. E21B 47/005 |
| 2020/0116883 A1 | 4/2020 | Padhi et al. |
| 2020/0116884 A1 | 4/2020 | Weng et al. |
| 2020/0199995 A1 | 6/2020 | Hu et al. |
| 2020/0378247 A1 | 12/2020 | Ma et al. |
| 2020/0400015 A1 | 12/2020 | Ge et al. |
| 2021/0055436 A1 | 2/2021 | Wu et al. |
| 2021/0102459 A1 | 4/2021 | Ewe et al. |
| 2021/0103069 A1 | 4/2021 | Jin et al. |
| 2021/0108510 A1 | 4/2021 | Ge et al. |
| 2021/0109241 A1 | 4/2021 | Wang et al. |
| 2021/0109243 A1 | 4/2021 | Ge et al. |
| 2021/0123339 A1 | 4/2021 | Steel et al. |
| 2021/0123731 A1 | 4/2021 | Chang et al. |
| 2021/0141115 A1 | 5/2021 | Wang et al. |
| 2021/0246777 A1 | 8/2021 | Zhao et al. |
| 2021/0285324 A1 | 9/2021 | Sirevaag |
| 2021/0396126 A1 | 12/2021 | Wang et al. |
| 2021/0396900 A1 | 12/2021 | Wang et al. |
| 2022/0381133 A1 | 12/2022 | Ge et al. |
| 2023/0161063 A1 * | 5/2023 | Geerits ................... G01V 1/284 367/75 |
| 2023/0194743 A1 | 6/2023 | Wang et al. |
| 2023/0213677 A1 | 7/2023 | Ge et al. |

FOREIGN PATENT DOCUMENTS

| | | |
|---|---|---|
| WO | 2023121683 | 6/2023 |
| WO | 2023129757 | 7/2023 |

OTHER PUBLICATIONS

"PCT Application No. PCT/US2021/072826, International Search Report and Written Opinion", Aug. 24, 2022, 11 pages.

"PCT Application No. PCT/US2021/073046, International Search Report and Written Opinion", Sep. 7, 2022, 11 pages.

Wang, et al., "The Wavefield of Acoustic Logging in a Cased-hole With a Single Casing—Part I: a Monopole Tool", Geophysical Journal International, vol. 212, Oct. 12, 2017, 15 pages.

(56) References Cited

OTHER PUBLICATIONS

"Great Britian Search Report for Application No. 2110237.1", Jan. 14, 2022, 3 pages.
Halliburton, "Wireline and Perforating Products and Services Catalog", 2013, 448 pages.
"U.S. Appl. No. 17/645,193, Non-Final Office Action", Sep. 27, 2023, 18 pages.
"Kuwait Application No. KWP2022000675 First Examination Report Mar. 5, 2024", Mar. 10, 2024, 9 pages.
"U.S. Appl. No. 17/645,193, Final Office Action", Feb. 23, 2024, 17 pages.
"PCT Application No. PCT/US2021/072826, International Preliminary Report on Patentability", Jun. 20, 2024, 7 pages.
"U.S. Appl. No. 17/645,193, Non-Final Office Action", Jun. 7, 2024, 19 pages.

* cited by examiner

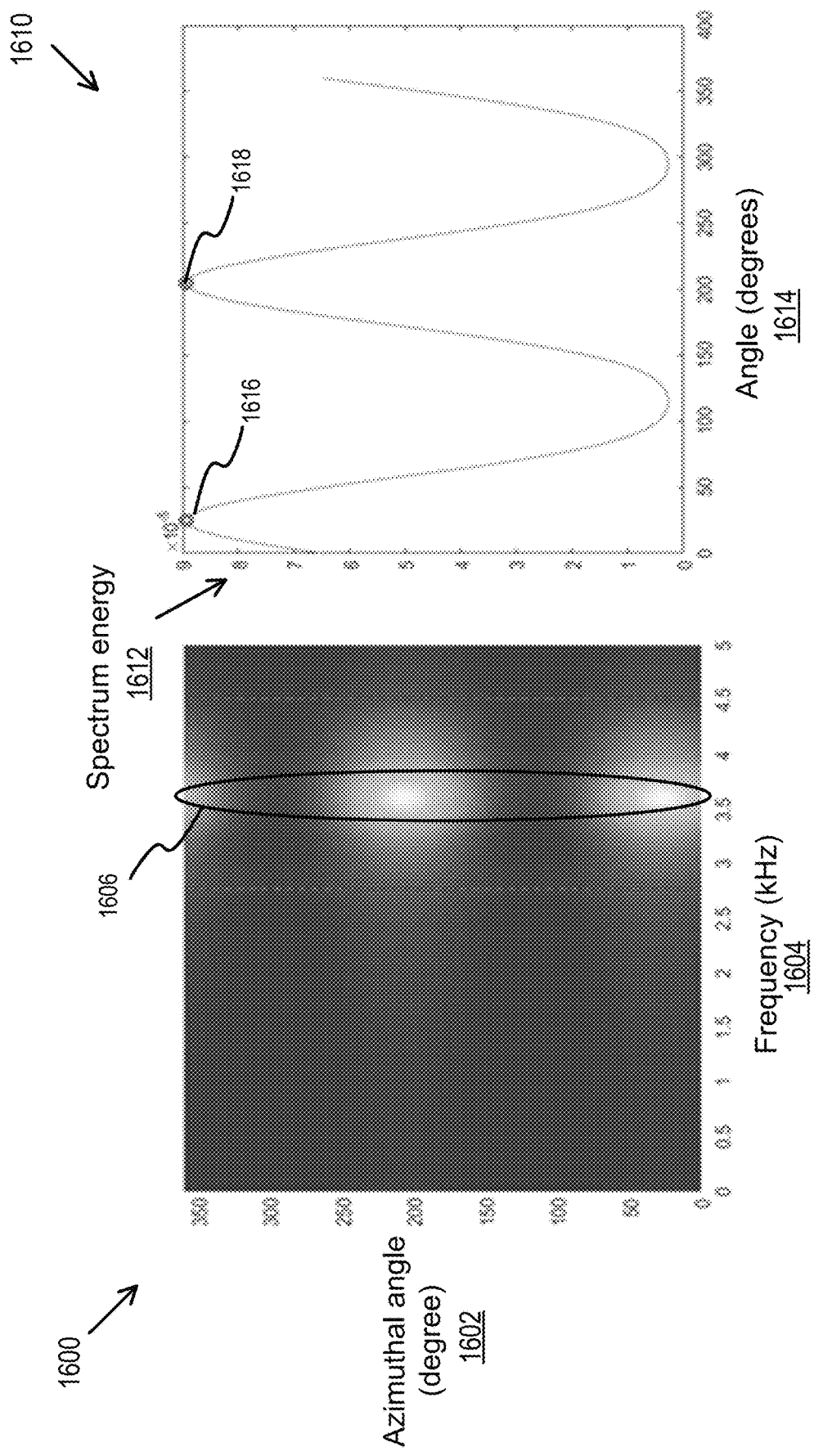

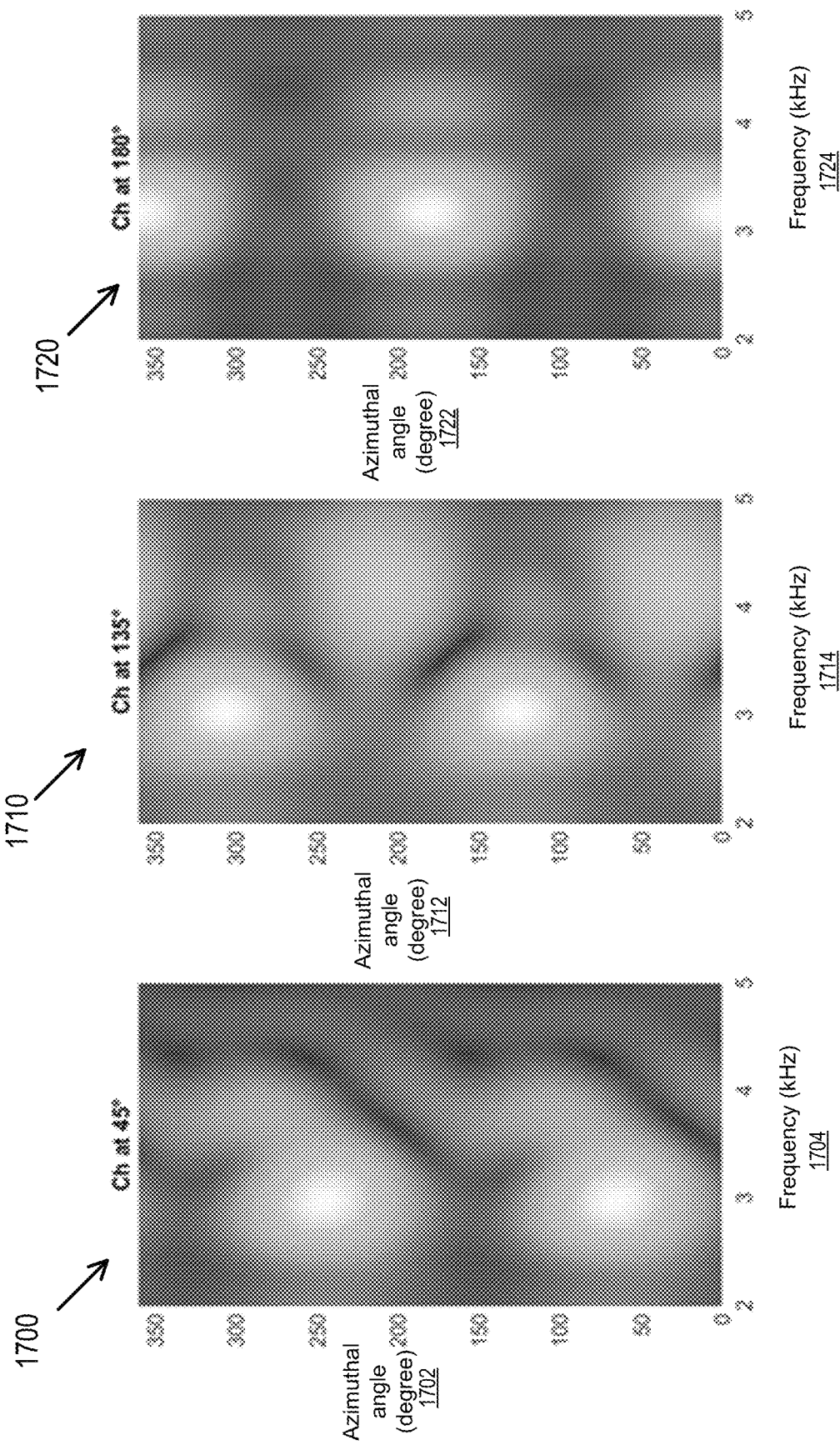

MULTI-POLE RESONANCE BASED THROUGH TUBING CEMENT EVALUATION

TECHNICAL FIELD

The disclosure generally relates to wellbores formed in subsurface formations, and in particular, evaluation of cement bonding condition placed in such wellbores.

BACKGROUND

In various acoustic well logging applications (such as anisotropy measurement, formation stress estimation, cement bond evaluation, etc.), a dipole transmitter and receiver can be employed to get the dipole response. Sometimes, the dipole transmitter needs to be fired at a specific direction, and the dipole response needs to be measured at a specific direction. However, physically rotating the transmitter and receiver can be challenging.

BRIEF DESCRIPTION OF THE DRAWINGS

Embodiments of the disclosure may be better understood by referencing the accompanying drawings.

FIG. 16A depicts a graph of an example frequency response of a rotated response versus the rotated angle, according to some embodiments.

FIG. 16B depicts a graph of an example amplitude of the selected mode based on the rotated angle, according to some embodiments.

FIGS. 17A-17C depict graphs of example rotated angle versus frequency response at a 45° azimuthal location, 135° azimuthal location, and 180° azimuthal location, respectively, according to some embodiments.

DESCRIPTION OF EMBODIMENTS

Figure 1A:
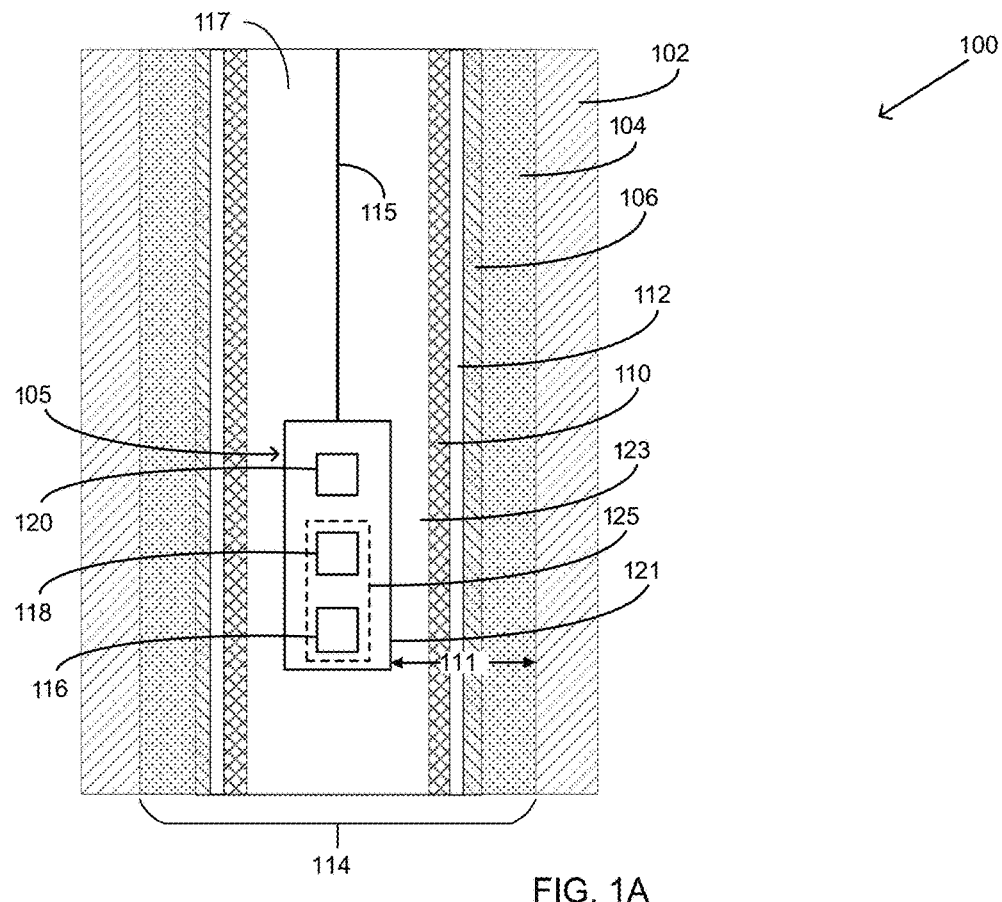
FIG. 1A depicts a side cross-sectional view of an example downhole tool having a transmitter and receiver for through tubing cement evaluation, according to some embodiments.

The description that follows includes example systems, methods, techniques, and program flows that embody embodiments of the disclosure. However, it is understood that this disclosure may be practiced without these specific details. For instance, this disclosure refers to different example transmitters and receivers (e.g., dipole, monopole, etc.) in illustrative examples. Embodiments of this disclosure can also be applied to other types of transmitters and receivers. As another example, this disclosure refers to evaluation of the cement bonding condition. Embodiments of this disclosure can also be applied to other material outside the casing, other properties of the cement or material, etc. In other instances, well-known instruction instances, protocols, structures and techniques have not been shown in detail in order not to obfuscate the description.

Example embodiments can be used for various downhole well logging applications, including through tubing cement evaluation (TTCE). For instance, example embodiments can include a transmitter and receiver (e.g., dipole) positioned in a wellbore for acoustic well logging (including anisotropy measurement, formation stress estimation, cement bond evaluation, etc.).

TTCE can be used as part of plug and abandonment operations of a wellbore. In particular, at the end of a well's life, cement integrity needs to be evaluated to ensure the well can be properly plugged. In a TTCE application, the downhole tool having the transmitter and receiver can be positioned within a production tubing that is within a casing of the wellbore. For the TTCE application, the cement bonding condition to be evaluated (via acoustic signaling) is positioned in an annulus that is between the casing and a wall of the wellbore. Thus, TTCE can be challenging because the acoustic signals emitted from a conventional downhole tool can have insufficient energy to penetrate beyond the production tubing. A conventional cement bond log (CBL) tool requires the production tubing to be pulled from the wellbore so that the acoustic signaling can directly reach casing through the wellbore fluid. The casing response can be too low relative to the overall signal, which makes evaluation of the cement behind the casing difficult. As further described below, in contrast to conventional TTCE approaches, example embodiments can evaluate cement integrity without removing the production tubing—which can result in significant savings in time and money.

Another challenge for accurate TTCE can include eccentricity, which can occur from the production tubing being off-center within the casing (which can be due to various factors, such as the curvature of the production tubing, well inclination, etc.). As the severity of the eccentricity increases, the effects caused by the casing also increases. Such effects can adversely affect cement evaluation. Thus, conventional approaches based on the assumption of no eccentricity may not provide accurate evaluations when there is eccentricity. Some embodiments can be configured to overcome the effect of eccentricity. In some implementations, eccentricity can be defined as displacement of at least one of the production tubing and the downhole tool away from the centering of the casing. In some implementations, the production tubing and the downhole tool can be assumed to be concentric with centralizers used to center the production tubing and the downhole tool. As further described below, example embodiments can include operations that can account for this eccentricity.

Conventional TTCE includes a monopole excited borehole resonance. However, a monopole resonance mode can change with eccentricity, thereby making isolation of the resonance in the time and frequency domain difficult. Thus, example embodiments include the use of a dipole resonance mode—which can have several advantages over a conventional monopole resonance mode. As further described below, a dipole resonance mode can provide an alternative approach to TTCE to complement the monopole result for a more accurate evaluation of the cement.

Some embodiments can include a dipole mode that can be excited with a cross-dipole (X dipole and Y dipole). In some implementations, a late time acoustic signal can be detected and transformed into the frequency domain. The peaks in the frequency domain can indicate the resonance modes of the wellbore. The casing-sensitive modes can be identified. The amplitude of the mode can then be used to perform cement evaluation (e.g., cement bonding). In the case of partial bonded case (casing with a fluid channel), the cross-dipole response can be rotated according to the channel direction to obtain desired response. Using a dipole mode, only one mode is be needed over the eccentricity from 0% up to approximately 90%. Also, eccentricity has limited effects on TTCE when using the dipole mode. Thus, as further described below, example embodiments can include the use of a low frequency dipole mode to provide for a more accurate TTCE, wherein the definition of low frequency can vary (e.g., 10 kilohertz, 5 kilohertz, etc.).

Example TTCE Application

Some embodiments can be used in a downhole application to increase the measurement sensitivity of through tubing cement evaluation (TTCE) and acoustic signals at target points such as at or near a casing, a cement layer, and/or a casing/cement interface. However, example embodiments can be used any other types of application. For example, example embodiments can be used in Measurement While Drilling and wireline operations, which are further described below. An example application for TTCE is now described. In particular, FIG. 1 depicts an example sensor configuration that is part of a through tubing cement evaluation (TTCE) system, according to some embodiments.

Figure 1B:
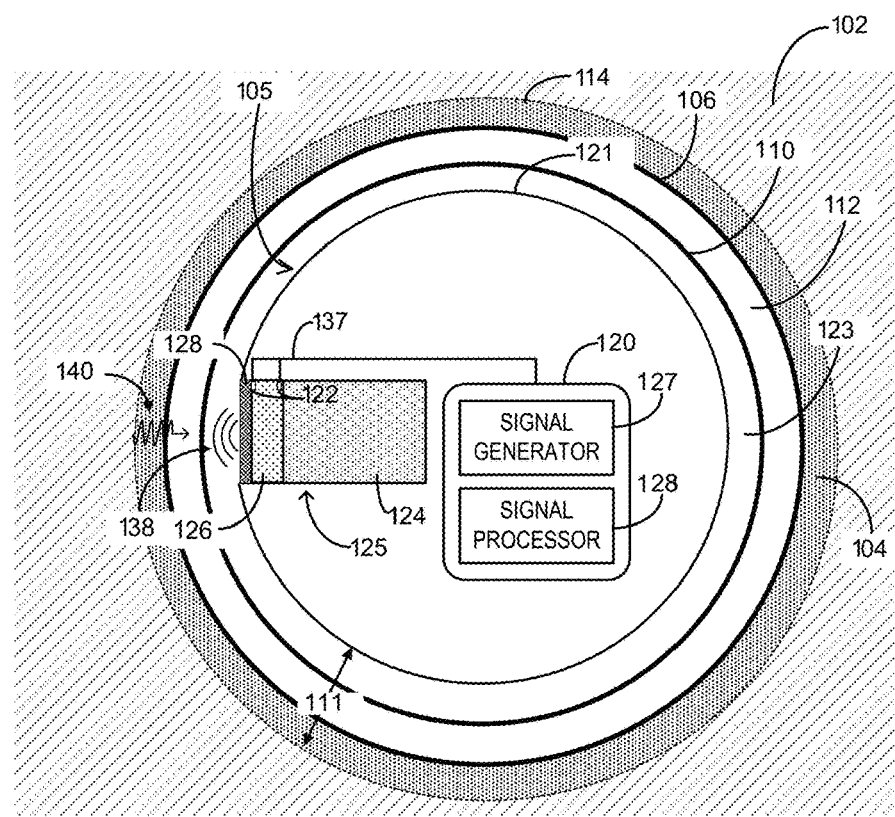
FIG. 1B depicts an overhead cross-sectional view of the example downhole tool of FIG. 1A, according to some embodiments.

FIG. 1A depicts a side cross-sectional view of an example downhole tool having a transmitter and receiver for through tubing cement evaluation, according to some embodiments. FIG. 1B depicts an overhead cross-sectional view of the example downhole tool of FIG. 1A, according to some embodiments.

As shown in FIGS. 1A and 1B (collectively, FIG. 1), an acoustic logging tool 105 is deployed within a well that is defined by a wellbore 114 in which a production tubing 110 is installed within cement and metallic casing layers. The acoustic logging tool 105 is generally configured to induce acoustic echo responses and process the responses to determine material and structural properties of multiple material layers within the wellbore 114. For example, the echo responses may comprise reflected and/or refracted acoustic waves generated when acoustic signals transmitted from acoustic logging tool 105 reflect and/or refract at acoustic impedance boundaries within and between the wellbore layers.

The wellbore 114 is formed within a subsurface formation 102, such as may comprise a hydrocarbon formation in part, by drilling, and is typically filled with liquid and/or slurry substances such as water, reservoir fluids, etc. The outer perimeter of the wellbore 114 can be sealed from the subsurface formation 102 by one or more barrier layers. For instance, a casing 106 comprises a metallic tubular member forming an inner liner that seals the interior of the wellbore 114. To securely position the casing 106 with respect to the inner surface of the subsurface formation 102, a cement layer 104 is formed between the casing 106 and the inner surface of the subsurface formation 102 that bounds the wellbore 114. The production tubing 110 is installed within the cylindrical interior space of the casing 106 to form an innermost production conduit 117 and an annular space 112 that typically forms an annular fluid layer between the outer surface of the production tubing 110 and the inner surface of casing 106.

The acoustic logging tool 105 includes a tool housing 121 within which an acoustic sensor 125 and a controller 120 can be disposed. As shown in FIG. 1A, the acoustic sensor 125 comprises an acoustic transmitter 116 and an acoustic receiver 118 within the tool housing 121 within which the controller 120 is also disposed. As further described below, the acoustic transmitter 116 can include one or more transmitters. Similarly, the acoustic receiver 118 can include one or more receivers.

The acoustic logging tool 105 is positioned within the innermost production conduit 117 in the production tubing 110 with an additional annular fluid layer 123 formed in the annular space between the outer surface of the tool housing 121 and the inner surface of the production tubing 110. The acoustic sensor components are movably disposed within the fluid and along the length of the production conduit 117 via a conveyance means 115 such as may be a wireline or slickline. In some embodiments, the acoustic sensor 125 may be configured with the acoustic transmitter 116 and the acoustic receiver 118 being individually contained and independently movable components. Alternatively, the acoustic sensor 125 may be configured within a contiguous sensor housing such as depicted in FIG. 1 in which both the transmitter 116 and the receiver 118 are contained in a common tool housing 121.

The acoustic logging tool 105 comprises acoustic source/transmission components and acoustic detection and processing components within the acoustic sensor 125. The transmitter and receiver components of the acoustic sensor 125 are configured to measure acoustic responses, such as in the form of acoustic echoes, generated from acoustic source signals transmitted from the acoustic transmitter 116 to various acoustic response target points within the wellbore 114. In the depicted embodiment of FIG. 1B, the acoustic sensor 125 comprises a transmitter and/or receiver that are configured as piezoelectric transducers that are electrically, optically, or otherwise communicatively coupled to the controller 120. The overhead representation in FIG. 1B of the acoustic sensor 125 may represent either a transmitter and/or a receiver, which may be distinct, axially offset components as shown in FIG. 1A.

As shown in FIG. 1B, the acoustic sensor 125 can include a transducer comprising a piezoelectric material layer 126 and a pair of electrodes 122 coupled to a front side and a back side of the piezoelectric material layer 126. An electrical or optical communication interface 137 can provide electrical contact and connectivity between the acoustic sensor 125 and controller 120. The acoustic sensor 125 can further include a backing material layer 124 disposed behind the piezoelectric material layer 126. The backing material layer 124 can include acoustic attenuation material such as ultrasonic attenuation material that is compositionally and structurally configured to attenuate acoustic waves emitted from the back side of the primary transducer. The acoustic sensor 125 can further include a protective cover layer 129 coupled to the radially outward front side of the transducer. The cover layer 129 can form a fluid impermeable seal preventing fluids from contacting the internal components of the acoustic sensor 125. To minimize front side external acoustic reflection during signal transmission and internal acoustic reflection during reception of acoustic echoes, the cover layer 129 may comprise a material having an acoustic impedance matching the acoustic impedance of the external acoustic medium, such as fluids within production conduit 117.

The controller 120 may be a programmable electronic module that is communicatively coupled to the piezoelectric transducer(s) of the transmitter/receiver components within the acoustic sensor 125. The controller 120 is configured, using electronics and program code instructions, to provide excitation pulse signals to the transducer electrodes during pulse transmit periods that may comprise the excitation phase of measurement cycles. The controller 120 can include a signal generator 127 and a signal processor 128. The signal generator 127 is configured using any combination of hardware and/or program code constructs to generate and send excitation pulse signals to the electrodes 122 via the communication interface 137 that may include one or more electrical conduction paths. The signal processor 128 is configured using any combination of hardware and/or program code constructs to detect/measure echo response signals received from receiver transducer electrodes via the communication interface 137.

The signal generator 127 can generate pulse signals comprising alternating current signals and corresponding voltage fluctuations that are applied to the transducer electrodes, resulting in fluctuating electrical fields and corresponding fluctuating electrical charges applied across the piezoelectric layer of the transducer within the acoustic transmitter 116. Piezoelectric effect results in changes to mechanical stress and consequent mechanical deformation of the piezoelectric material layers. The mechanical deformation corresponds in terms of frequency and amplitude to the frequency and amplitude of the received electrical excitations signals, resulting in an ultrasonic vibration of the piezoelectric layer. The ultrasonic vibration of the piezoelectric layer mechanically induces corresponding ultrasonic pressure waves within and across the wellbore 114. The acoustic pressure waves generated by the transmitter transducer, such as the sensor pulse 138, propagate through a wellbore annulus 111 that includes all of the material layers and layer boundaries within the wellbore 114. The sensor pulse 138 induces a corresponding acoustic echo signal 140 that results from reflection and/or refraction from various downhole acoustic boundaries within and at the boundaries between the various material layers within the wellbore 114.

Sensor pulses, such as the sensor pulse 138, can be generated periodically, intermittently, or otherwise as part of individual measurement cycles. Each measurement cycle can begin with an excitation phase during which the signal generator 127 applies an electrical excitation that induces corresponding acoustic pulses in the transmitter transducer(s) to which the excitation is applied. Each measurement cycle can further include an echo response phase such as may be defined and implemented by the signal processor components 128. During the echo response phase of each measurement cycle, signal processor components can detect and process acoustic echo response signals such as the signal 140 that are transduced by a receiver transducer from acoustic waves to an electrical acoustic response signal.

TTCE analysis can include acoustic response information that is location-specific (e.g., along the cylindrical boundary between the cement layer 104 and the casing 106) as well as properties specific (e.g., density, structural characteristics). The multiple different material layers that may present acoustic barriers (reflectors and sinks) and varying ambient environmental conditions may present interference for or otherwise reduce accuracy of the acoustic measurements and particularly acoustic measurements for which the target response locations are outside of one or more of the wellbore tubulars such as the production tubing 110 and the casing 106. The apparatus 100 is configured to collect and process acoustic response information in a manner that removes interference such as extraneous acoustic response information and sensor variations to enable more accurate representation of target acoustic response information. The acoustic measurement components of the apparatus 100 are configured to implement efficient and accurate acoustic measurements of wellbore material properties with reduced reliance on removing internal acoustic barriers such as production tubing.

In some embodiments, the apparatus 100 is configured to collect acoustic measurement information that uses differential processing of acoustic responses to more precisely isolate intended acoustic response information such as cement bond response information. As further described below, the acoustic transmitter 116 can include an azimuthally directional transmitter such as a dipole transmitter that emits acoustic pulses. Also, as further described below, the acoustic receiver 118 can be a multi-receiver array. For example, the acoustic receiver 118 can be an array of two or more azimuthal receivers.

The target points for acoustic measurements by the directional acoustic transmitter/receiver pair may be included along one or more circumferential boundaries at various radial distances from the center of the wellbore 114. In the depicted embodiment, primary target points may be included in the cylindrical contact interface between the cement layer 104 and the outer metallic surface of the casing 106. Target points may also be included between the inner and outer surfaces of the cement layer 104 and or within other material layers or material boundaries within the wellbore 114. For example, target points may be included at the liquid/metal boundary between the annular fluid layer 112 and the casing 106 to test casing material properties such as calcium or other mineral buildup on the casing surface. All or most target points are located outside of the production tubing 110 and some of the most important, such as cement-to-casing bond target points, are located outside of both the production tubing 110 and the casing 106.

Figure 2:
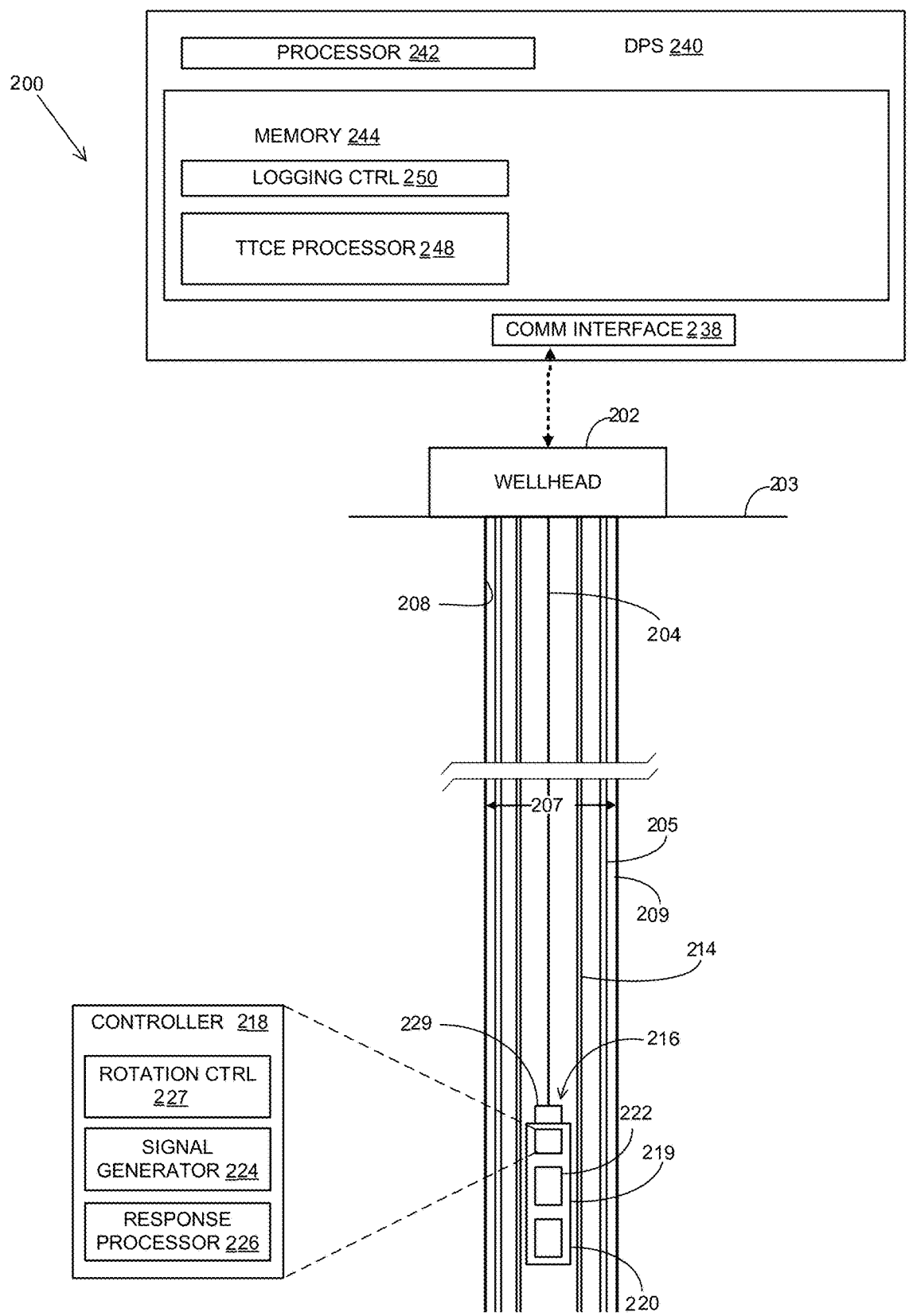
FIG. 2 depicts an example system that is configured to implement through tubing cement evaluation (TTCE), according to some embodiments.

FIG. 2 depicts an example system that is configured to implement through tubing cement evaluation (TTCE), according to some embodiments. In FIG. 2, a well system 200 is particularly configured to address issues posed by TTCE, which entails measuring acoustic responses, such as acoustic echoes, generated by acoustic source signals that originate within an innermost tubing within a wellbore. The well system 200 includes subsystems, devices, and components configured to implement acoustic measurement testing procedures within a substantially cylindrical wellbore volume 207 that in the depicted embodiment is bounded and sealed by a casing 205. A cement layer 209 between the casing 205 and an inner borehole wall 208 provides a protective seal that maintains structural and positional stability of the casing 205. The well system 200 includes a wellhead 202 configured to deploy drilling and production and/or injection equipment such as drilling strings, production strings, etc. As shown, an interior tubing 214 is deployed within the wellbore volume 207 and may comprise production tubing, drilling tubing such as drill pipes, injection tubing, or other type of tubing.

The wellhead 202 includes components for configuring and controlling deployment in terms of insertion and withdrawal of a test string within the wellbore volume 207. The test string may be configured as a wireline test string deployed within the interior tubing 214 and having a wireline cable 204 for moving and providing communication and power source connectivity for downhole test tools. In the depicted embodiment, the wireline cable 204 is configured as the conveyance means for a logging tool 216 that includes an acoustic transmitter 220 and an acoustic receiver 222 disposed within a tool housing 219. Communication and power source couplings are provided to the acoustic transmitter 220 and the acoustic receiver 222 via the wireline cable 204 having one or more communication and power terminals within the wellhead 202.

The acoustic transmitter 220 and the acoustic receiver 222 comprise components, including components not expressly depicted, configured to implement acoustic measurement testing including TTCE testing. The acoustic transmitter 220 may be configured as an acoustic transducer as depicted in FIG. 1B that transmits acoustic pulses in an azimuthally directional manner.

The acoustic receiver 222 may comprise an array of azimuthal receivers with two or more receivers. The logging tool 216 further includes a controller 218 comprising components including a signal generator 224 and a response processor 226 for controlling acoustic measurement operation. The signal generator 224 is configured to generate electrical signals that are converted by the acoustic transmitter 220 into acoustic waves emitted within the wellbore 207. The response processor 226 is configured to measure acoustic responses by processing the converted acoustic wave information from the acoustic receiver 222.

The logging tool 216 is coupled via a telemetry link within the wireline cable 204 to a data processing system (DPS) 240. The DPS 240 includes a communication interface 238 configured to transmit and receive signals to and from the logging tool 216 as well as other devices within well system 200 using a communication channel with the wireline cable 204 as well as other telemetry links such as wireless electromagnetic links, acoustic links, etc. The DPS 240 may be implemented in any of one or more of a variety of standalone or networked computer processing environments. As shown, the DPS 240 may operate above a terrain surface 203 within or proximate to the wellhead 202, for example. The DPS 240 includes processing, memory, and storage components configured to receive and process acoustic measurement information to determine material and structural properties and conditions within and/or external to the cylindrical volume defined by the borehole wall 208. The DPS 240 is configured to receive acoustic response data from the logging tool 216 as well as from other sources such as surface test facilities. The acoustic data received from the logging tool 216 includes echo response signals detected by the acoustic receiver 222. The DPS 240 comprises, in part, a computer processor 242 and a memory 244 configured to execute program instructions for controlling measurement cycles and processing the resultant echo response signals to determine wellbore material properties. Such properties and structural attributes may include but are not limited to cement structural integrity and the state of adhesion of the bonding between the cement layer 209 and the casing 205.

The DPS 240 includes program components including a TTCE processor 248 and a logging controller 250. The TTCE processor 248 includes program components and data configured to process acoustic response data received from the logging tool 216. The logging controller 250 includes program components and data configured to coordinate and otherwise control positioning and repositioning of the logging tool 216 within and along the length of the interior tubing 214, as well as the acoustic measurement procedures at each position. Loaded from the memory 244, the TTCE processor 248 is configured to execute program instructions to receive and process acoustic response data such as the logging data 230.

The components within the DPS 240 and the test string interoperate to implement acoustic measurement collection and processing in a manner enabling optimal accuracy of through tubing material evaluation. A next acoustic measurement cycle may begin with positioning of the logging tool 216 at a next axial location along the length of interior tubing 214. At the next axial location, the logging tool 216 can rotationally positioned to an initial specified azimuthal angle. In the depicted embodiment, the logging tool 216 may be rotated via controlled actuation of a DC motor 229. For example, a rotation controller 227 may be incorporated within the controller 218 and be configured to azimuthally position the logging tool 216, and more specifically the transmitter/receiver within the logging tool 216, to a specified initial measurement azimuth angle.

The measurement cycle may continue with the logging tool 216 measuring an acoustic response at the initial azimuthal angle. For TTCE logging, the overall acoustic response includes an echo response window in which echo signal characteristics profile material and structural characteristics of the cement-to-casing bonding at the azimuth angle. Following the initial azimuth measurement, the logging tool 216 is rotated to a next azimuth at which a next azimuthally specific acoustic response is measured and otherwise collected, and the process is repeated at other azimuthal angles along a full 360° azimuthal path. The azimuthal angles at which the measurements are performed are selected to result in measurement pairs that are substantially azimuthally offset (e.g., one measurement is separated by at least 90° from the other measurement in the pair). In some embodiments, the measurement angles are selected to result in measurement pairs that are substantially azimuthally opposed (e.g., separated by approximately 180° within a range of 10°). It should be noted that the measurements at each point may be nearly instantaneous due to the proximity of the cement layer target points such that the rotation of the logging tool 216 between measurements may be intermittent or continuous.

Example Transmitter-Receiver Configurations

Figure 3:
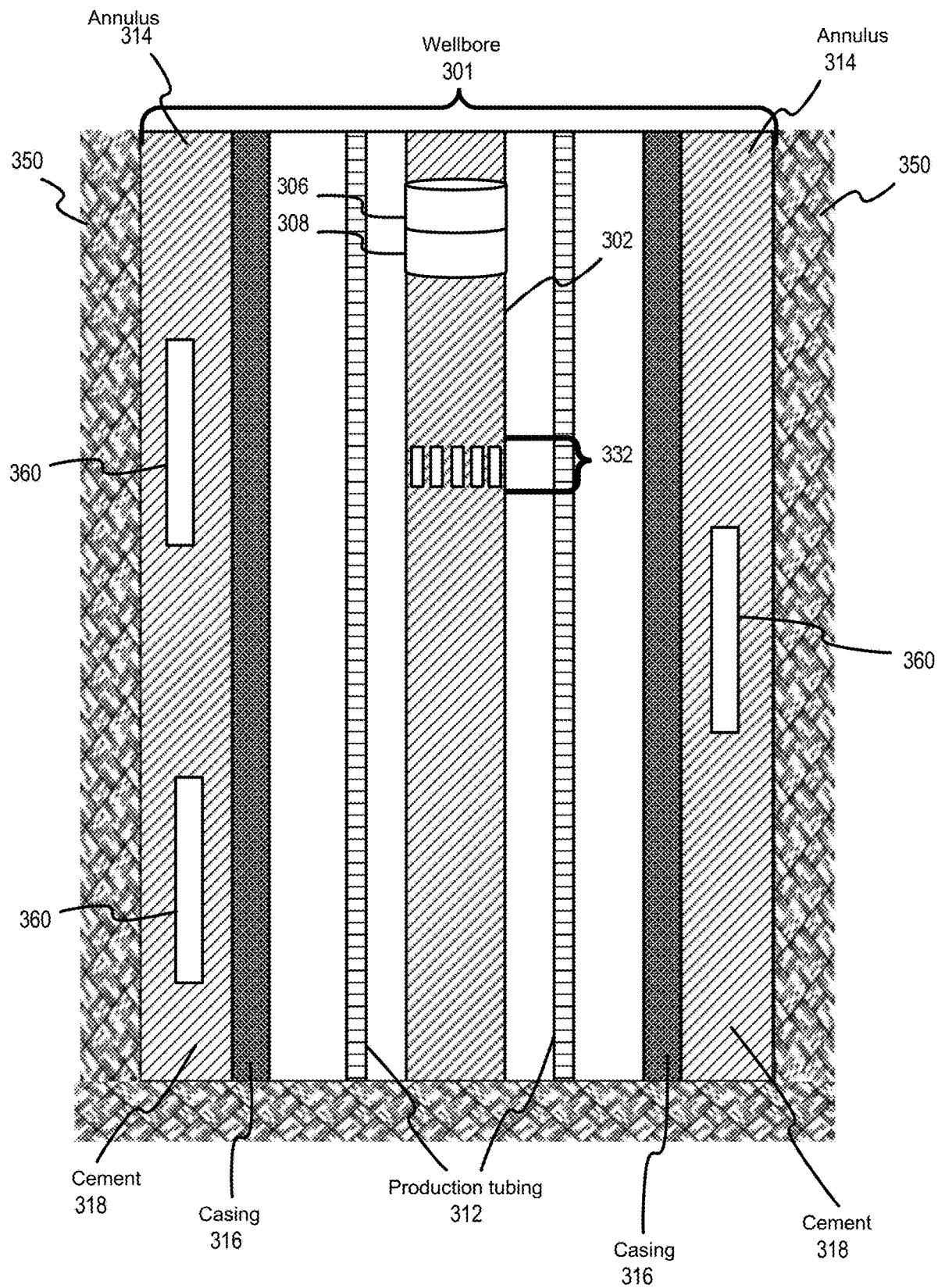
FIG. 3 depicts a first example transmitter-receiver configuration having a cross-dipole transmitter and azimuthal receiver array for performing TTCE, according to some embodiments.

Example transmitter-receiver configurations are now described. Two example configurations are now described. Both configurations can be arranged to generate a dipole emission from different azimuthal positions. FIG. 3 depicts a first example transmitter-receiver configuration having a cross-dipole transmitter and azimuthal receiver array for performing TTCE, according to some embodiments. FIG. 3 depicts a wellbore 301 formed in a subsurface formation 350. The wellbore 301 has been cased (with a casing 316) such that an annulus 314 has been defined between a wall of the wellbore 301 and the casing 316. A cement 318 has been poured into the annulus 314. In this example, the cement 318 includes three channels 360. Thus, these portions of the cement 318 are partially (not fully) bonded. As further described below, example embodiments can evaluate the cement to determine varying bonding conditions of the cement.

A production tubing 312 has been positioned down the wellbore 301 within the casing 316. A downhole tool 302 is positioned within the production tubing 312. In this example, the downhole tool 302 includes a cross-dipole transmitter that includes an X dipole transmitter 306 and a Y dipole transmitter 308. The X dipole transmitter 306 and the Y dipole transmitter 308 can emit in directions that are orthogonal to each other. In some implementations, the cross-dipole transmitter can be replaced with a single dipole transmitter such that the transmitter can rotate to emit from the two orthogonal directions.

Additionally, a receiver array 332 is positioned at a different longitudinal position as compared to the cross-dipole transmitter. In this example, the receiver array 332 includes a number of receivers are at different azimuthal positions circumferentially around the downhole tool 302. In some implementations, the receiver array 332 can be replaced with an X dipole receiver and a Y dipole receiver to receive the dipole response being emitted from the cross-dipole transmitter. In operation, the transmitter(s) can emit acoustic waves that interact with the wellbore structure (including the production tubing 312, the casing 316, wellbore fluid, and the downhole tool 302 itself). The returned acoustic wave can be detected by the receiver array 332. Example operations of the first example transmitter-receiver configuration is further described below in reference to FIGS. 5-6.

Figure 4:
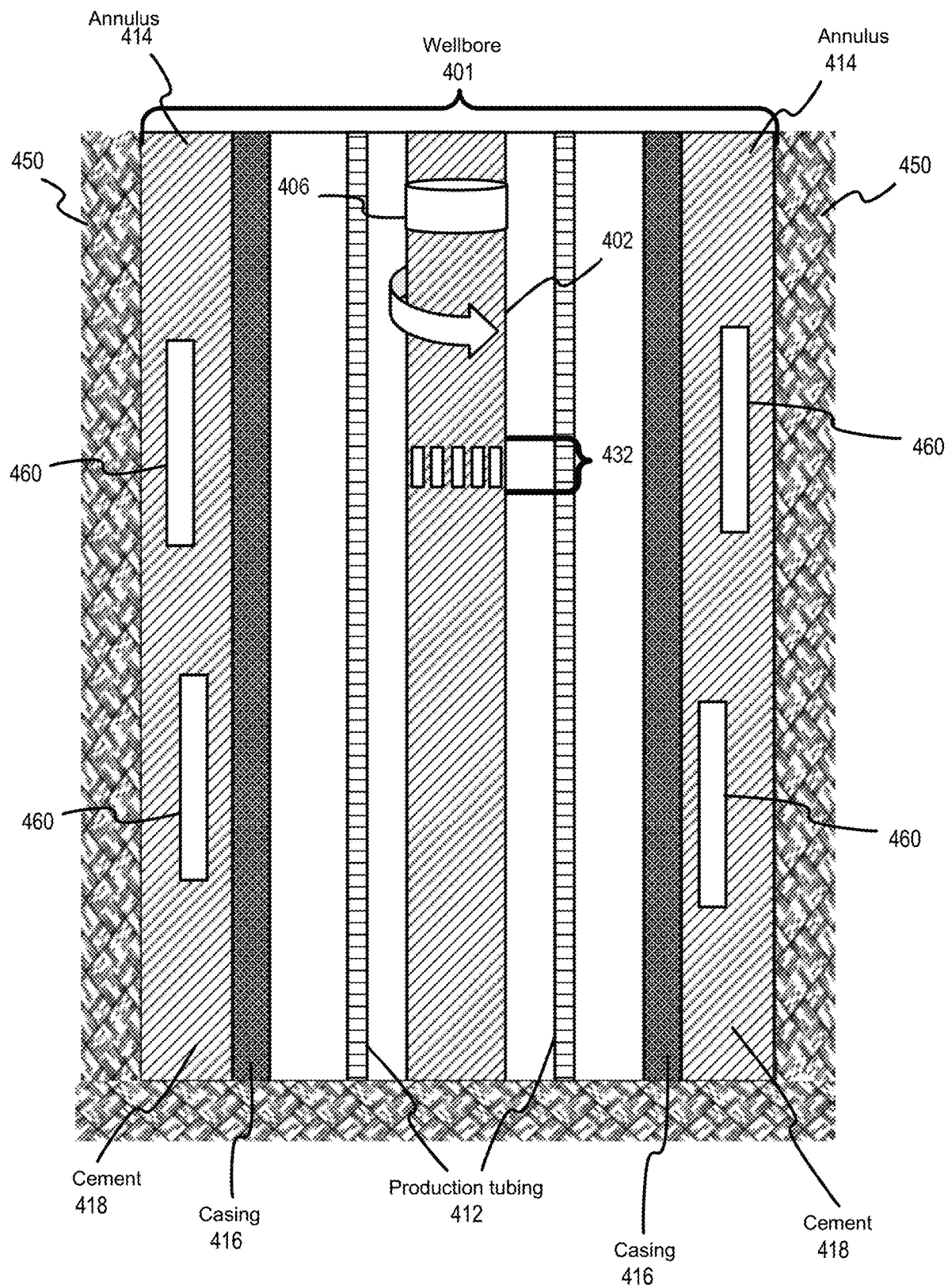
FIG. 4 depicts a second example transmitter-receiver configuration having a rotatable transmitter and azimuthal receiver array for performing TTCE, according to some embodiments.

FIG. 4 depicts a second example transmitter-receiver configuration having a rotatable transmitter and azimuthal receiver array for performing TTCE, according to some embodiments. FIG. 4 depicts a wellbore 401 formed in a subsurface formation 450. The wellbore 401 has been cased (with a casing 416) such that an annulus 414 has been defined between a wall of the wellbore 401 and the casing 416. A cement 418 has been poured into the annulus 414. In this example, the cement 418 includes four channels 460. Thus, these portions of the cement 418 are partially (not fully) bonded. As further described below, example embodiments can evaluate the cement to determine varying bonding conditions of the cement.

A production tubing 412 has been positioned down the wellbore 401 within the casing 416. A downhole tool 402 is positioned within the production tubing 412. In this example, the downhole tool 402 includes a rotatable transmitter 406. The rotatable transmitter 406 can rotate for emission in different azimuthal directions. In some implementations, the rotatable transmitter 406 can be a unipole, dipole, or higher order pole. The rotatable transmitter 406 can emit acoustic transmissions at different azimuthal directions such that there is at least one rotation. The dipole component along any direction can be computed by summing the dipole response of each of the emissions at the specific direction.

Additionally, a receiver array 432 is positioned at a different longitudinal position as compared to the rotatable transmitter 406. In this example, the receiver array 432 includes a number of receivers are at different azimuthal positions circumferentially around the downhole tool 402. In some implementations, the receiver array 432 can be replaced with an X dipole receiver and a Y dipole receiver to receive the dipole response being emitted from the rotatable transmitter 406. Also, the receiver array or receivers can be mounted on a fixed or rotatable section of the downhole tool 402. In operation, the rotatable transmitter 406 can emit acoustic waves that interact with the wellbore structure (including the production tubing 412, the casing 416, wellbore fluid, and the downhole tool 402 itself). The returned acoustic wave can be detected by the receiver array 432. Example operations of the second example transmitter-receiver configuration is further described below in reference to FIGS. 21-22.

Example Operations

Figure 5:
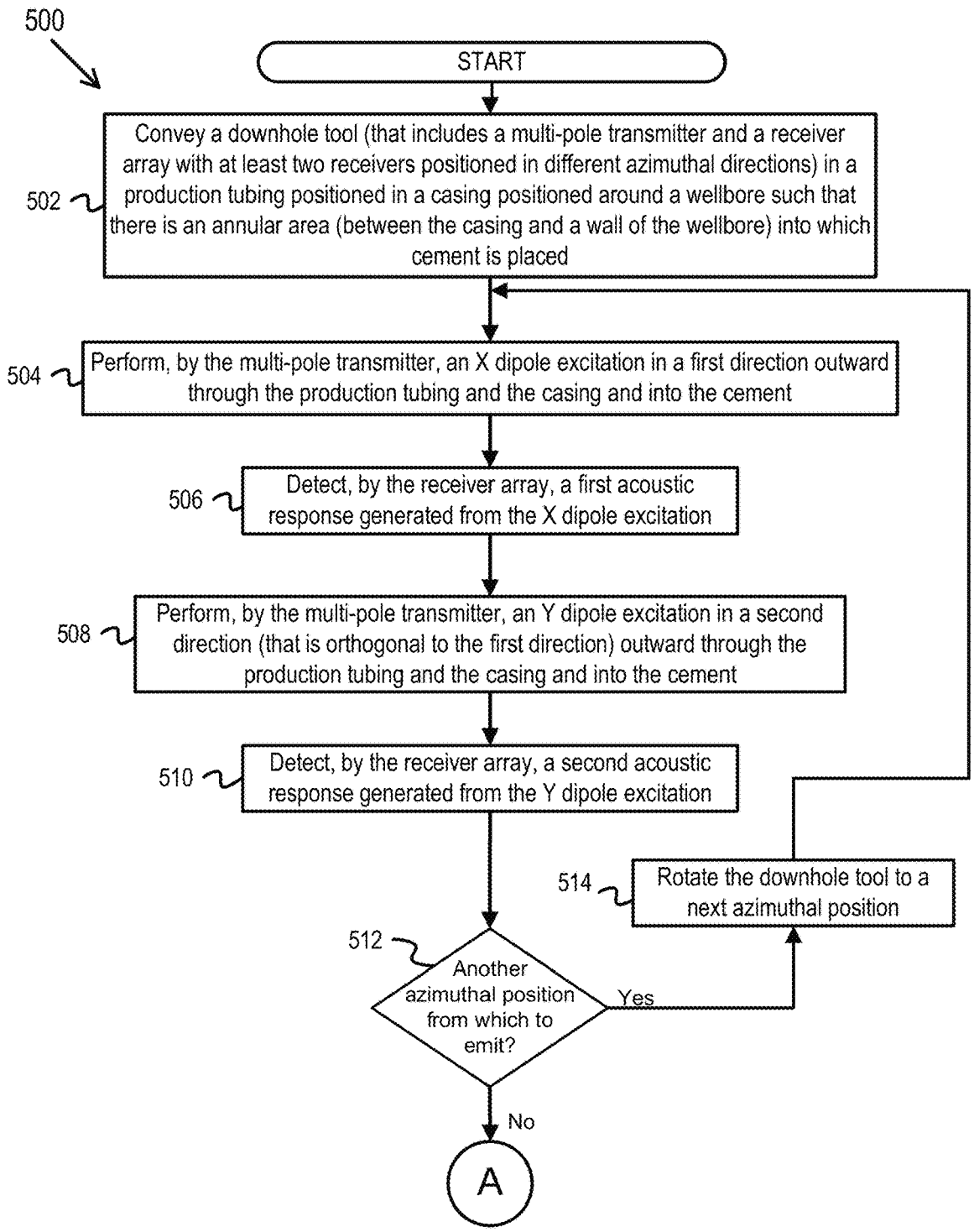
FIGS. 5-6 depict a flowchart of first example operations for performing TTCE using wellbore multi-pole resonance, according to some embodiments.
Figure 6:
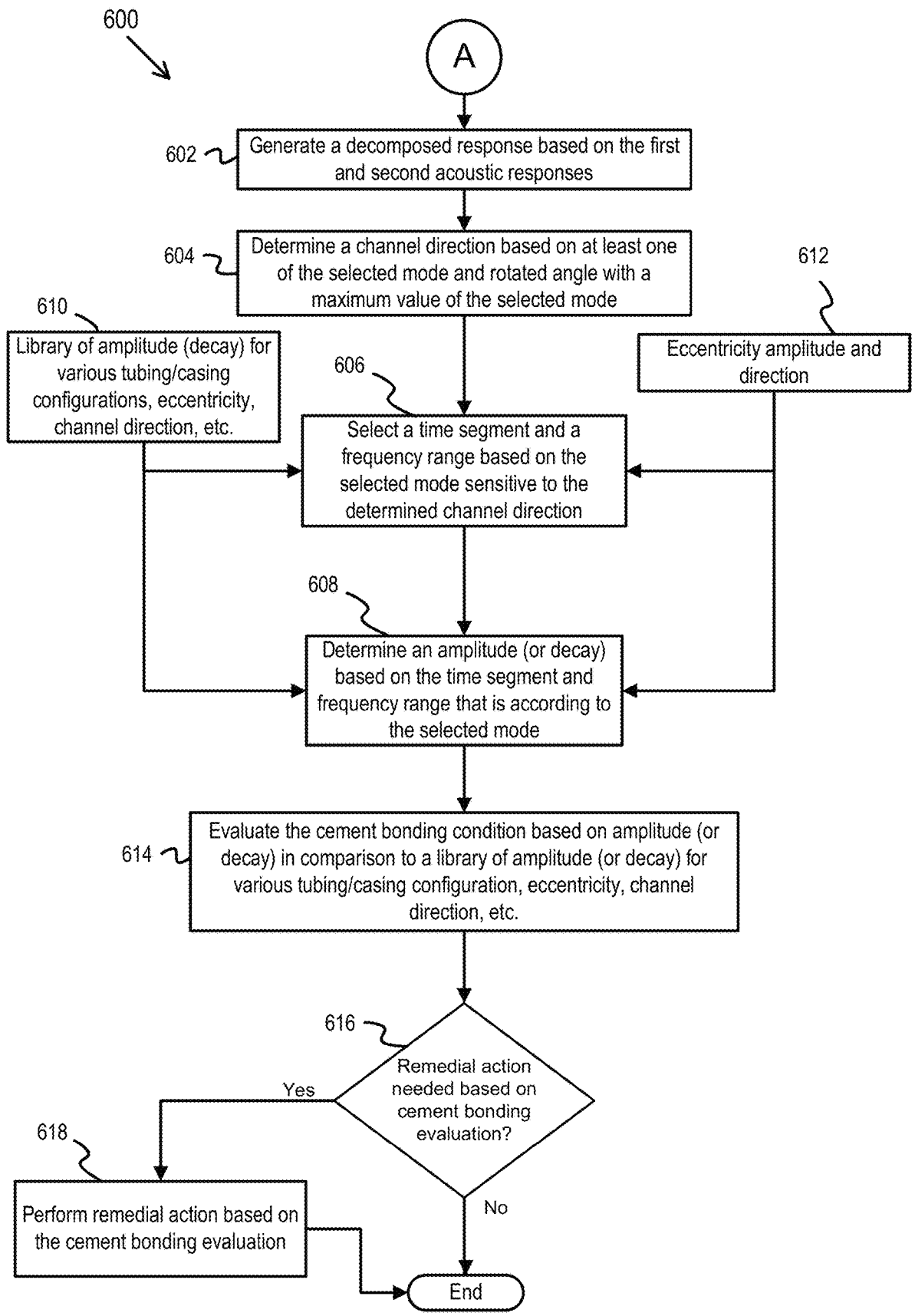

Example operations are now described. FIGS. 5-6 depict a flowchart of first example operations for performing TTCE using wellbore multi-pole resonance, according to some embodiments. FIGS. 5-6 depict a flowchart 500 and a flowchart 600, respectively, having operations that include a transition point A for operations to move between the flowchart 500 and the flowchart 600. Operations of the flowchart 500-600 can be performed by software, firmware, hardware or a combination thereof. Such operations are described with reference to the systems of FIGS. 1A-1B and 2-3. However, such operations can be performed by other systems or components. For example, at least some of the operations of the flowcharts 500-600 are described as being performed by a computer at a surface of the wellbore. In some embodiments, one or more of these operations can be performed by a computer at the surface and/or downhole in the wellbore. The operations of the flowchart 500 start at block 502.

At block 502, a downhole tool (having a multi-pole transmitter and a receiver array with at least two receivers positioned in different azimuthal positions) is conveyed in a production tubing positioned in a casing positioned around a wellbore such that there is an annular area (between the casing and a wall of the wellbore) into which cement is placed. For example, with reference to FIG. 3, the downhole tool 302 is lowered down the wellbore 301 within the production tubing 312.

At block 504, an acoustic transmission is emitted, based on an X dipole excitation by the multi-pole transmitter, in a first direction (outward through the production tubing and the casing and into the cement). For example, with reference to FIG. 3, the transmitter 306 can perform an X dipole excitation outward in a first direction in the wellbore 301 outward toward through the production tubing 312 and the casing 316 and into the cement 318.

At block 506, an acoustic response generated from the X dipole excitation is detected by the receiver array. For example, with reference to FIG. 3, one or more of the receivers 330-338 can detect an acoustic response generated from the acoustic transmission that passes through the production tubing 312 and the casing 316 and into the cement 318.

At block 508, an acoustic transmission is emitted, based on a Y dipole excitation by the multi-pole transmitter, in a second direction that is orthogonal to the first direction (outward through the production tubing and the casing and into the cement). For example, with reference to FIG. 3, the transmitter 306 can perform an Y dipole excitation outward in a second direction in the wellbore 301 outward toward through the production tubing 312 and the casing 316 and into the cement 318.

At block 510, an acoustic response generated from the Y dipole excitation is detected by the receiver array. For example, with reference to FIG. 3, one or more of the receivers 330-338 can detect an acoustic response generated from the acoustic transmission that passes through the production tubing 312 and the casing 316 and into the cement 318.

At block 512, a determination is made of whether there is another azimuthal position from which to emit an acoustic transmission. For example, with reference to FIG. 2, the logging controller 250 can make this determination. For instance, the TTCE operations may be configured such that emission and detection may be performed at N number of different azimuthal positions. Accordingly, the logging controller 250 can determine whether emission and detection has occurred at each of the N number of azimuthal positions. If there is another azimuthal position from which to emit an acoustic transmission, operations of the flowchart 500 continue at block 514. Otherwise, operations of the flowchart 500 continue at transition point A, which continues at transition point A of the flowchart 600 of FIG. 6.

At block 514, the downhole tool is rotated to a next azimuthal position. For example, with reference to FIG. 2, the logging controller 250 can cause the downhole tool to be rotated in a next azimuthal position from which an X-dipole excitation, Y-dipole excitation, and detection. Operations of the flowchart 500 then return to block 504 to emit an X-dipole excitation.

From transition point A of the flowchart 600 of FIG. 6, operations continue at block 602.

Figure 7:
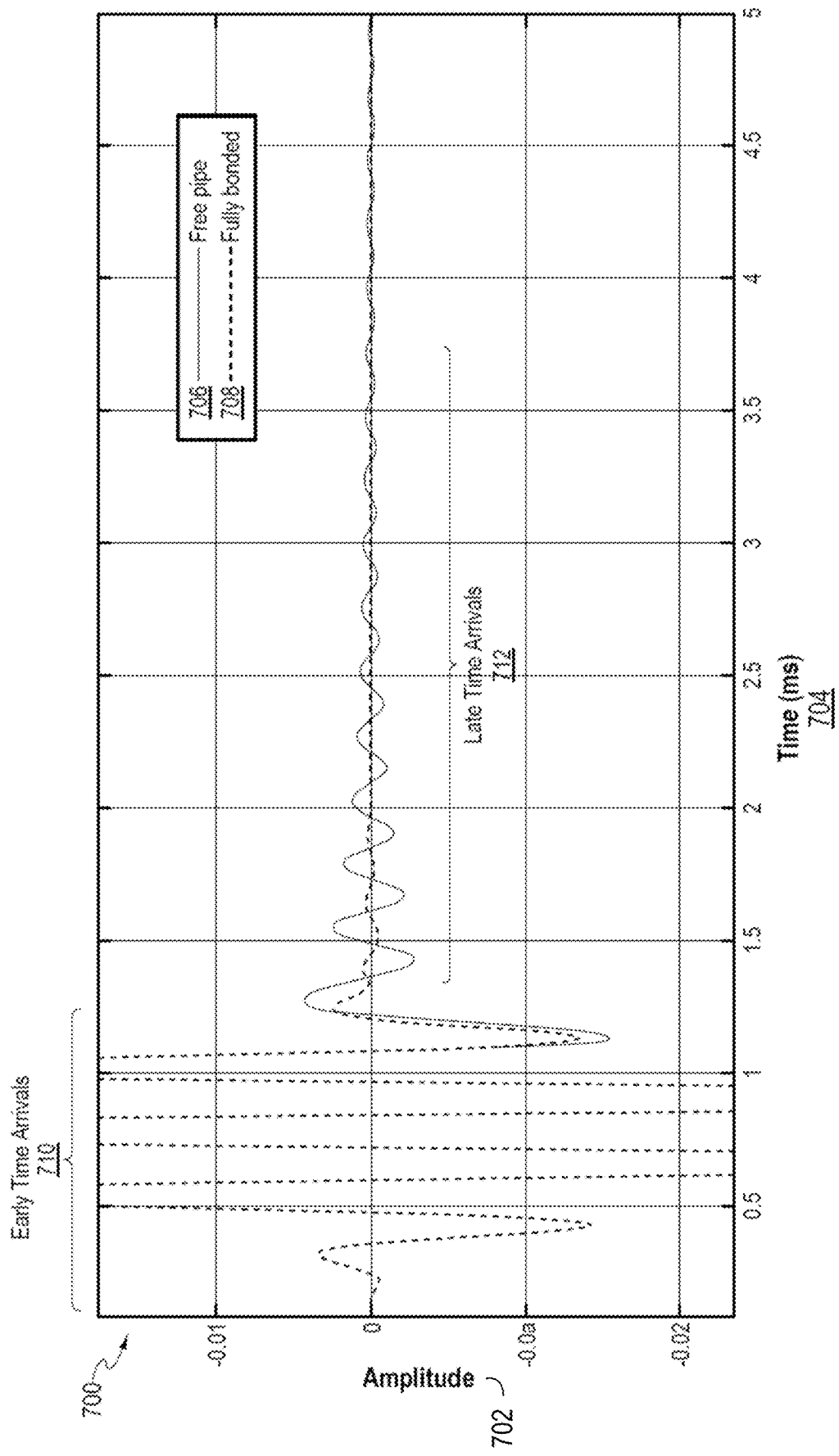
FIG. 7 depicts a graph of an example sample time domain decomposed response for casing with and without cement bonding, according to some embodiments.

At block 602, a decomposed response is generated from the first and second acoustic responses. For example, with reference to FIG. 2, the TTCE processor 248 can generate the decomposed response. To illustrate, FIG. 7 depicts a graph of an example sample time domain decomposed response for casing with and without cement bonding, according to some embodiments. In FIG. 7, a graph 700 includes a y-axis 702 that is an amplitude of the response and an x-axis 704 that is time (micro-seconds). The graph 700 includes a curve 706 and a curve 708. The curve 706 is an acoustic response that traverses a free pipe section of the casing/cement (in which the cement is not fully bonded to the casing). The curve 708 is an acoustic response that traverses a fully bonded section of the casing/cement (in which the cement is fully bonded to the casing).

In the graph 700, the signal is a decomposed dipole response computed from eight azimuthal receivers. A range 710 includes early time arrivals. As shown, the range 710 includes the bulk of the acoustic energy, which can include reflection from the production tubing, reflection from the casing through the production tubing, guided wave refraction from the production tubing, guided-wave refraction from the casing through the production tubing, Stoneley wave, tool wave, etc. After a certain time, certain waves propagate away from the receiver in the form of a guided casing wave, a guided tubing wave, a tool wave, a Stoneley wave or multiple reflections. Hence in a range 712 that includes the late time arrivals, the signal is observed to have fixed frequency components and with decreasing amplitude over time. This can be considered the borehole resonance mode. The graph 700 shows that the dipole signal with a four kilohertz frequency is sensitive to cement bonding behind the casing (as the free pipe case is showing much higher time domain signal compared to a fully bonded case).

Figure 8:
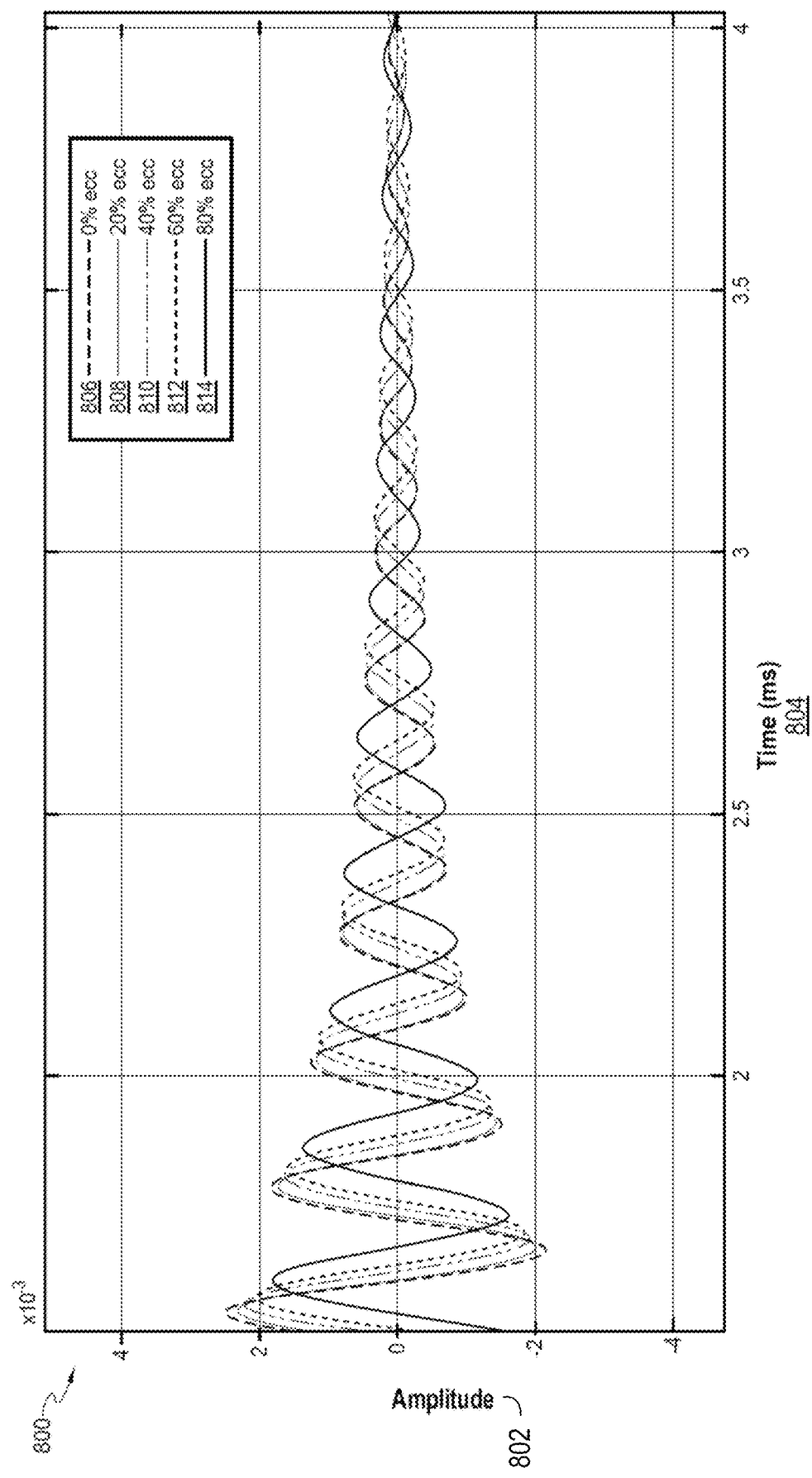
FIG. 8 depicts a graph of example dipole late time responses for various eccentricities with a free pipe condition, according to some embodiments.

FIG. 8 depicts a graph of example dipole late time responses for various eccentricities with a free pipe condition, according to some embodiments. In FIG. 8, a graph 800 includes a y-axis 802 that is an amplitude of the response and an x-axis 804 that is time (micro-seconds). The graph 800 includes example dipole responses for a free pipe condition (no cement bonding on the casing) at five different eccentricities. A response 806 is an example dipole response at 0% eccentricity. A response 808 is an example dipole response at 20% eccentricity. A response 810 is an example dipole response at 40% eccentricity. A response 812 is an example dipole response at 60% eccentricity. A response 814 is an example dipole response at 80% eccentricity.

The eccentricity can be measured in terms of percentage, which is calculated to be the production tubing/tool offset divided by the annulus thickness between production tubing and casing. Hence a 0% eccentricity means that the production tubing/tool is concentric, while 100% eccentricity means that the production tubing is touching the casing inner wall. The graph 700 shows that for various eccentricities, both amplitude and decay rate remain essentially the same. Therefore, amplitude or decay can be used to invert the cement bonding to the casing with limited influence from eccentricity. As shown, different levels of eccentricity have a limited effect on the dipole responses. Thus, dipole responses can be essentially insensitive to eccentricity. Additionally, as shown, the amount of decay of the responses over time is similar across the different levels of eccentricity.

Figure 9:
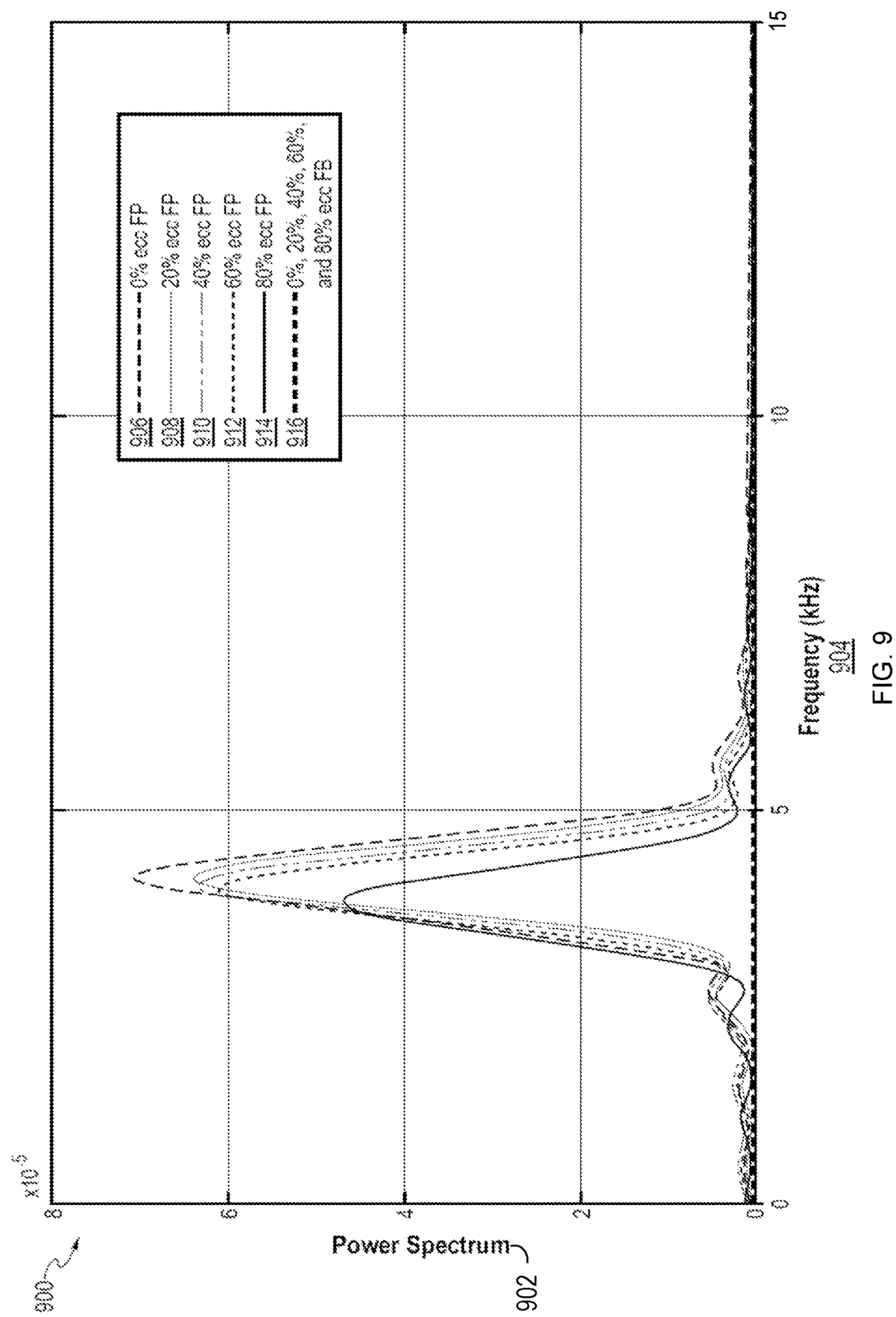
FIG. 9 depicts a graph that includes the example dipole late time responses of FIG. 8 transformed into the frequency domain, according to some embodiments.

FIG. 9 depicts a graph that includes the example dipole late time responses of FIG. 8 transformed into the frequency domain, according to some embodiments. In FIG. 9, a graph 900 includes example frequency domain responses for various eccentricities with free pipe and fully bonded conditions. The graph 900 includes a y-axis 902 that is a power spectrum of the response and an x-axis 904 that is frequency (kilohertz).

The graph 900 includes example dipole responses for a free pipe (FP) condition (no cement bonding on the casing) at five different eccentricities (responses 906-914). A response 906 is an example dipole response for a FP condition at 0% eccentricity. A response 908 is an example dipole response for a FP condition at 20% eccentricity. A response 910 is an example dipole response for a FP condition at 40% eccentricity. A response 912 is an example dipole response for a FP condition at 60% eccentricity. A response 914 is an example dipole response for a FP condition at 80% eccentricity.

The graph 900 also includes example dipole responses for a fully bonded (FB) condition (cement bonding on the casing) at five different eccentricities (responses 916-924). A response 916 is an example dipole response for a FB condition at 0% eccentricity. A response 918 is an example dipole response for a FB condition at 20% eccentricity. A response 920 is an example dipole response for a FB condition at 40% eccentricity. A response 922 is an example dipole response for a FB condition at 60% eccentricity. A response 924 is an example dipole response for a FB condition at 80% eccentricity. The FP (free pipe) responses show high modal energy near 4 kHz with relatively similar amplitude. The FB (fully bonded) responses shows minimum energy.

The energy variation for both FP and FB responses for different eccentricities can be plotted—by converting the overall energy computed as an integration of the frequency domain amplitude from FIG. 9. In particular, FIG. 10 depicts a graph of example dipole energies for free pipe and fully bonded conditions based on the responses of FIG. 9, according to some embodiments.

Figure 10:
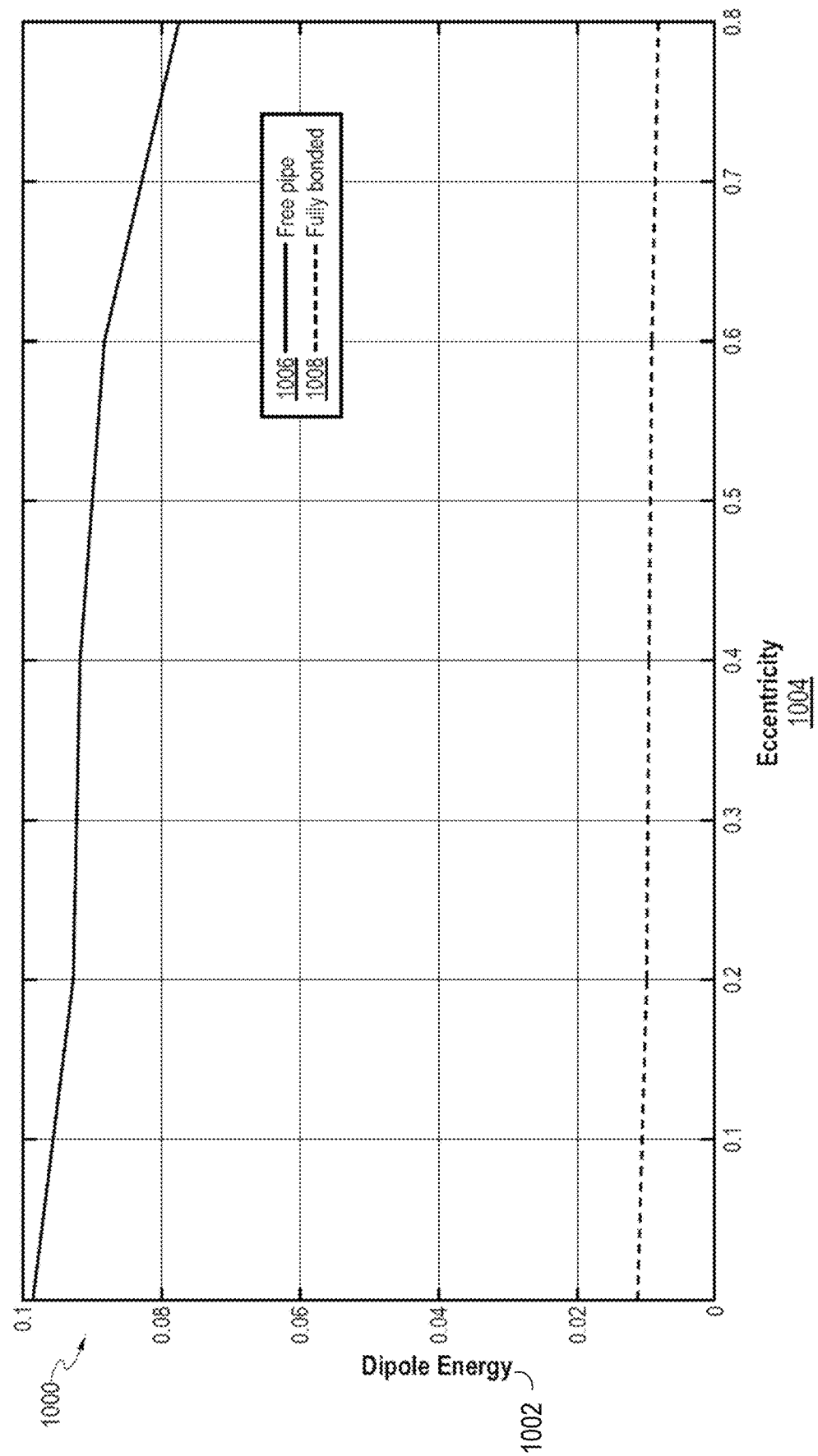
FIG. 10 depicts a graph of example dipole energies for free pipe and fully bonded conditions based on the responses of FIG. 9, according to some embodiments.

In FIG. 10, a graph 1000 includes a y-axis 1002 that is a dipole energy of the response and an x-axis 1004 that is eccentricity. A curve 1006 represents an energy variation over different eccentricities for a free pipe condition. A curve 1008 represents an energy variation over different eccentricities for a fully bonded condition. As shown, the free pipe condition and the fully bonded condition can be identified based on the energy of a specific mode (four kHz dipole mode in this example). Accordingly, the decay from the time domain signal can be extracted. This decay of a specific mode can be used to identify free pipe and fully bonded responses. As shown by the curve 1008, the fully bonded responses have minimal energy that is essentially flat. As shown by the curve 1006, the free pipe responses have a higher energy that decreases slowly over time. Because of this separation in energy levels between fully bonded responses and free pipe responses, a response can be correctly identified as fully bonded or free pipe based on the energy level of the response.

Returning to the flowchart 600, operations continue at block 604.

Figure 11:
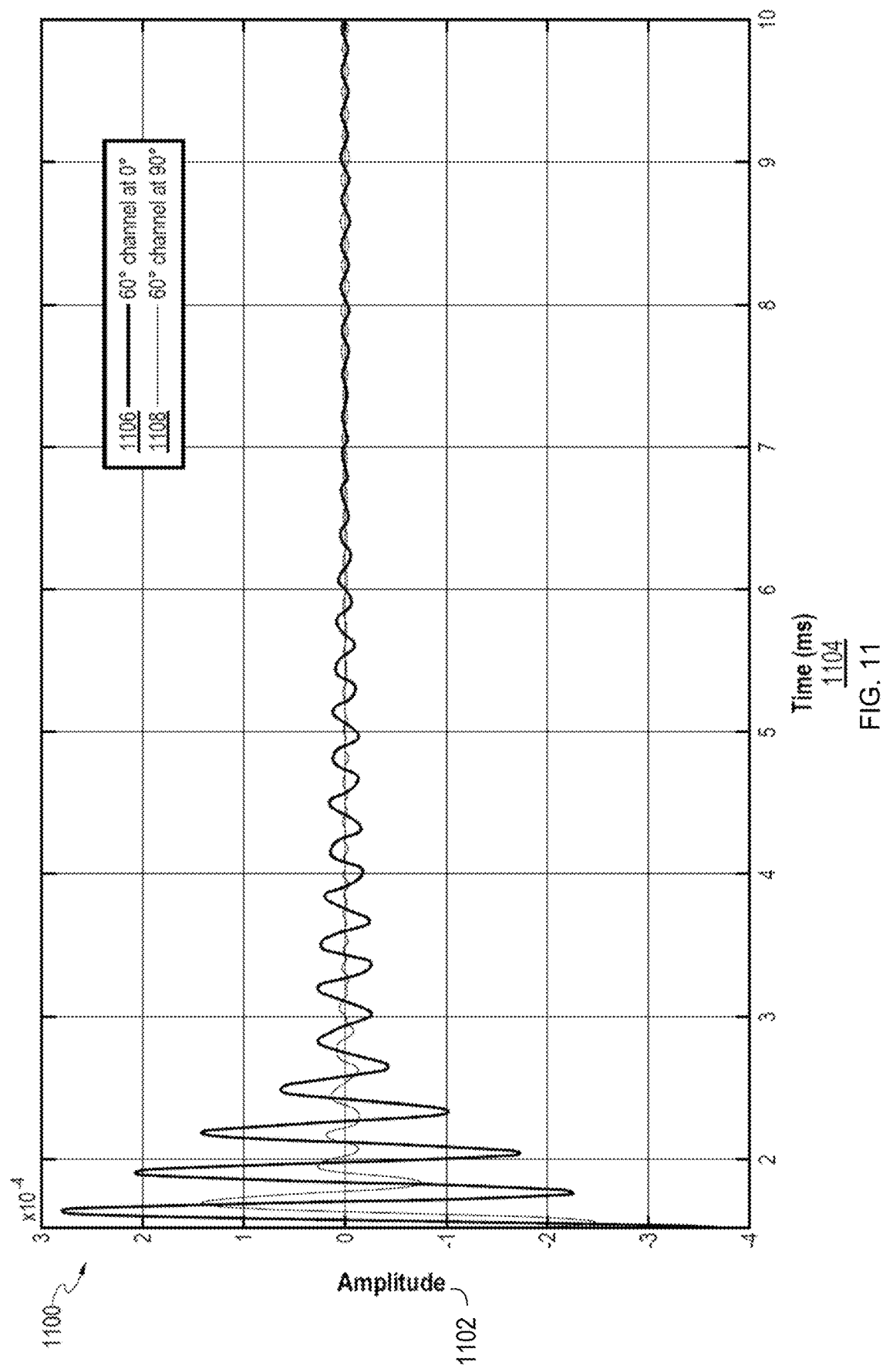
FIG. 11 depicts a graph of example time domain resonance signals for a Y dipole excitation while the channel is at 0° and 90°, according to some embodiments.

At block 604, a channel direction is determined based on at least one of the selected mode and rotated angle with a maximum value of the selected mode. For example, with reference to FIG. 2, the TTCE processor 248 can determine the channel direction. A channel direction can be determined without and with eccentricity. Examples of how to determine of a channel direction without eccentricity is first described. A dipole response has directionality because of its mode shape. Therefore, the dipole response varies as the dipole direction changes. For example, for a Y dipole excitation (dipole direction along Y axis), the response of a channel is higher at 0°/180° as compared to 90°/270°. FIG. 11 depicts a graph of example time domain resonance signals for a Y dipole excitation while the channel is at 0° and 90°, according to some embodiments. In FIG. 11, a graph 1100 includes a y-axis 1102 that is an amplitude of the response and an x-axis 1104 that is time (micro-seconds). A curve 1106 represents a dipole response while the channel is at 0°. A curve 1108 represents a dipole response while the channel is at 90°.

Figure 12B:
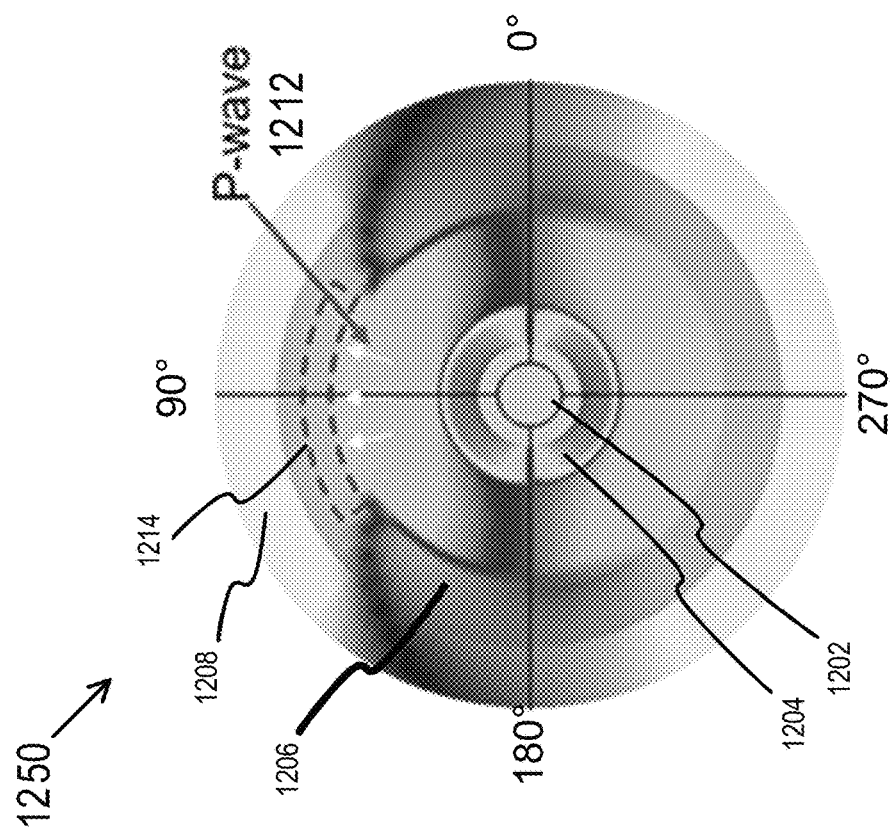
FIGS. 12A-12B depict example snapshots of dipole energy for a Y dipole excitation for the channel at 0° and 90°, respectively, according to some embodiments.
Figure 12A:
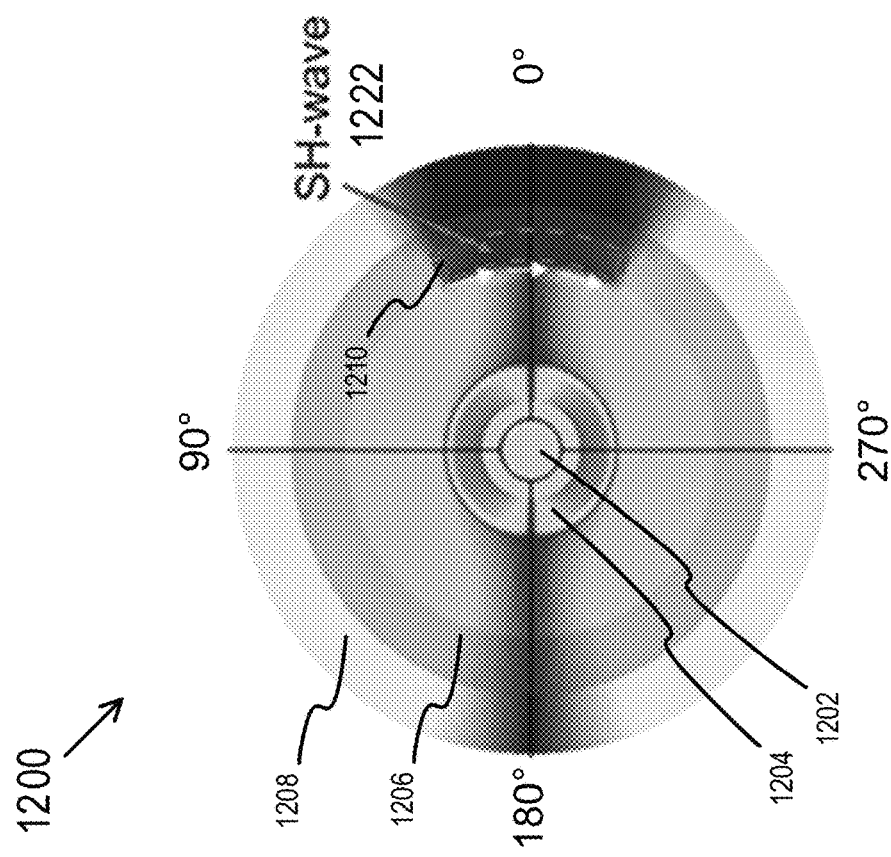

The reason for directional response is that the dipole energy radiates into the surrounding material in two general forms—P-wave (compressional wave) and SH-wave (horizontal shear wave). To illustrate, FIGS. 12A-12B depict example snapshots of dipole energy for a Y dipole excitation for the channel at 0° and 90°, respectively, according to some embodiments. FIG. 12A depicts a snapshot 1200 of dipole energy for a Y dipole excitation for the channel at 0°. FIG. 12B depicts a snapshot 1250 of dipole energy for a Y dipole excitation for the channel at 90°.

In the snapshots 1200 and 1250, the darker shading indicates lower stress or pressure, while the lighter shading indicates higher stress or pressure. The snapshots 1200 and 1250 depict a downhole tool 1202 (that include any of the example transmitter-receiver configurations described herein). The snapshots 1200 and 1250 also depicts the downhole tool 1202 within a production tubing 1204 that is within a casing 1206. A cement 1208 is outside the casing 1206.

The snapshot 1200 depicts a channel 1210 at 0°. As shown in the snapshot 1200, for a Y dipole, the area near 0°/180° is dominated by SH-wave radiation. The acoustic energy is transmitted to the cement 1208 behind the casing 1206 in the form of an SH-wave 1222. When fluid in a channel exists behind the casing 1206, the SH-wave 1222 gets totally reflected and resulted in higher energy (also corresponding to the curve 1106 in the graph 1100 of FIG. 11).

As shown in the snapshot 1250, for a Y dipole, the area near 0°/180° is dominated by P-wave radiation. A P-wave 1212 can partially be transmitted through fluid in a channel behind the casing 1206 and into the subsurface formation. Therefore, more acoustic energy is lost when the channel occurs at this angle (also corresponding to the curve 1108 in the graph 1100 of FIG. 11). Accordingly, the snapshot 1250 is very similar to a fully bonded case.

Figure 13A:
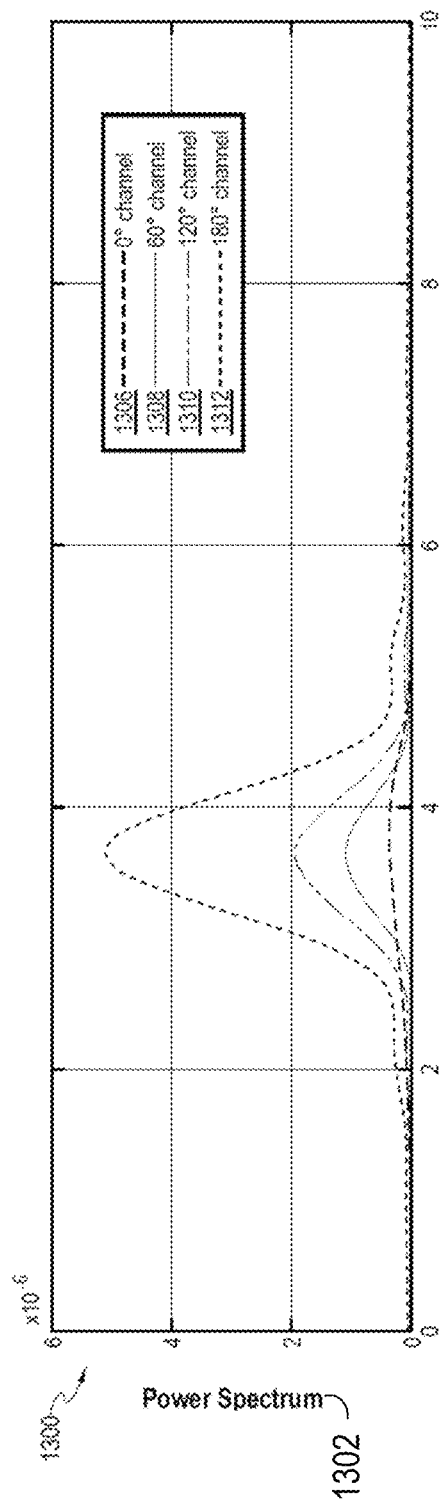
FIGS. 13A-13B depict graphs of example dipole excited responses for channels of different sizes in the frequency domain and amplitude, respectively, according to some embodiments.
Figure 13B:
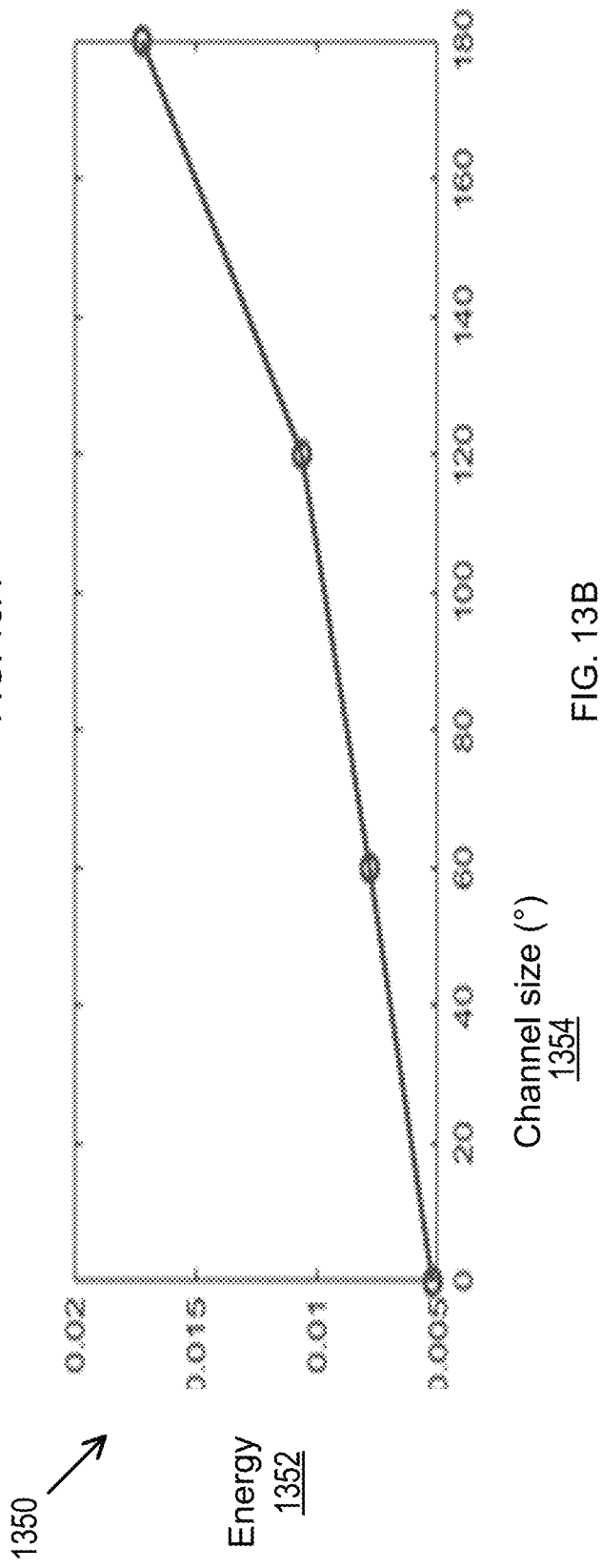

FIGS. 13A-13B depict graphs of example dipole excited responses for channels of different sizes in the frequency domain and amplitude, respectively, according to some embodiments. In FIG. 13A, a graph 1300 shows the frequency domain response of a Y dipole excitation for fluid channels of various size at 0°. The graph 1300 includes a y-axis 1302 that is the power spectrum and an x-axis 1304 that is the frequency for the dipole excited responses.

A curve 1306 is a dipole excited response with the channel at 0°. A curve 1308 is a dipole excited response with the channel at 60°. A curve 1310 is a dipole excited response with the channel at 120°. A curve 1312 is a dipole excited response with the channel at 0°. A curve 1308 is a dipole excited response with the channel at 180°.

In FIG. 13B, a graph 1350 shows a relationship between the energy and the channel size. The graph 1350 includes a y-axis 1352 that is the energy between approximately 3.1 kHz and 4.2 kHz and an x-axis 1354 that is the channel size (which can be defined as the number of degrees in an arc). The graph 1350 includes an x-axis 1354 that is the channel size. The amplitude of a dipole excited response can be positively related to the channel size. Accordingly, the channel size of a given response can be determined based on its amplitude.

Figure 14B:
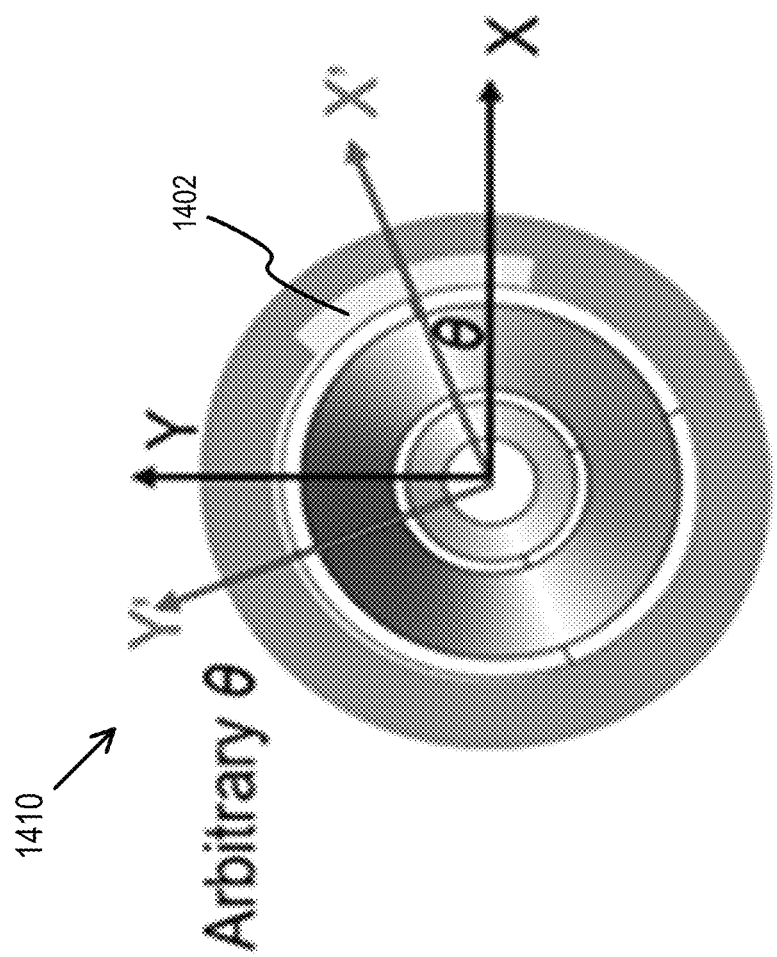
FIGS. 14A-14B depict example cross-dipole responses rotated 360° with the tool at a standard orientation and an arbitrary orientation, respectively, according to some embodiments.

A fluid channel in the cement can occur at any azimuthal location. Also, the dipole response can be sensitive to this azimuthal location. Accordingly, in some embodiments, the dipole response can be rotated based on the channel direction to provide consistent results. To illustrate, FIGS. 14A-14B depict example cross-dipole responses rotated 360° with the tool at a standard orientation and an arbitrary orientation, respectively, according to some embodiments.

Figure 14A:
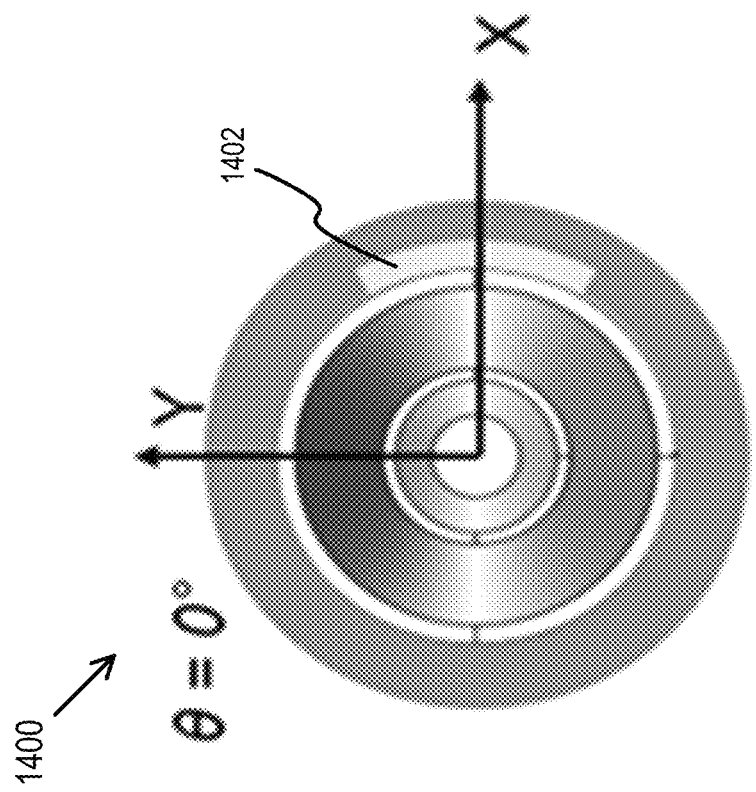

In FIG. 14A, a graph 1400 depicts a standard configuration where a channel 1402 is at 0° and the dipole excitation is along Y direction. In FIG. 14B, the graph 1410 depicts an arbitrary orientation where the channel 1402 is at angle θ relative to 0°. In some implementations, if the channel is at an arbitrary orientation, the channel can be computationally rotated to a standard orientation. For example, for the arbitrary orientation depicted in FIG. 14B, the dipole response can be computationally rotated such that the response is rotated to a standard orientation where θ is 0°.

Alternatively, the dipole response can be obtained at a specific direction by using multiple acoustic emissions at different azimuths. For example, a rotating unipole transmitter can emit acoustic transmissions at different azimuths via one or more revolutions. The average dipole response can then be determined at a specific azimuthal direction.

Figure 15:
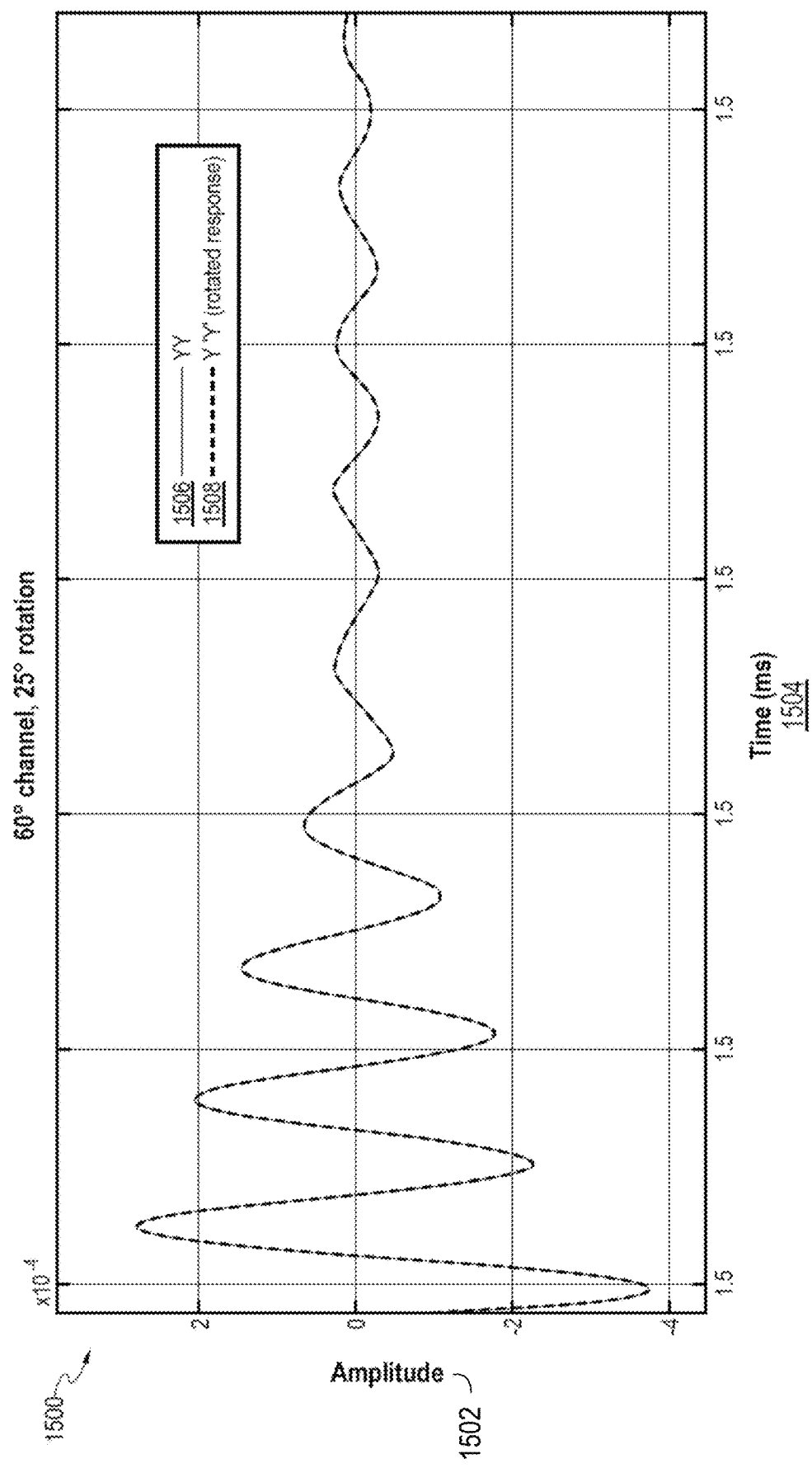
FIG. 15 depicts graph of an example rotated tool response with a 25° rotation compared to an example tool response with a standard orientation, according to some embodiments.

To illustrate, FIG. 15 depicts graph of an example rotated tool response with a 25° rotation compared to an example tool response with a standard orientation, according to some embodiments. In FIG. 15, a graph 1500 includes a y-axis 1502 that is an amplitude of a response and an x-axis 1504 that is time (ms). A curve 1506 is the response at a standard orientation where θ is 0° (YY). A curve 1508 is the response that is rotated such that θ is 25° (Y"Y").

The channel direction can be determined by decomposing the response to 360° and finding the direction with a highest energy. To illustrate, FIG. 16A depicts a graph of an example frequency response of a rotated response versus the rotated angle, according to some embodiments. FIG. 16B depicts a graph of an example amplitude of the selected mode based on the rotated angle, according to some embodiments.

An example of a tubing/casing configuration with zero eccentricity and a 60° channel at 25° is shown in FIGS. 16A-16B. In FIG. 16A, a graph 1600 includes a y-axis 1602 that is an azimuthal angle (degrees) and an x-axis 1604 that is frequency (kHz). In FIG. 16B, a graph 1610 includes a y-axis 1612 that is the spectrum energy between 2.6 kHz to 4.6 kHz and an x-axis 1614 that is the azimuthal angle (degrees).

As shown in graph 1600, the highest energy is near 3.6 kHz (1606). The energy of the dipole mode near 3.6 kHz can be computed within a frequency range and plotted as shown by the graph 1610 of FIG. 16B. In graph 1610 of FIG. 16B, the maximum amplitude corresponds to the channel location at 25° (1616). Due to the symmetry property of a dipole, another peak is shown at 105° (1618). Hence the channel direction can be identified with 180° ambiguity. However, the response at both angles can be identical and can be used to measure the channel size.

Some embodiments can identify a channel location even with eccentricity. For cases with fluid channel or/and eccentricity, asymmetry can be introduced into the wellbore by channel location and eccentricity direction. The asymmetry can cause the original dipole mode to convert to other modes with a different mode shape and frequency. FIGS. 17A-17C depict graphs of example rotated angle versus frequency response at a 45° azimuthal location, 135° azimuthal location, and 180° azimuthal location, respectively, according to some embodiments. FIG. 17A depicts a graph 1700 having a y-axis 1702 that is the azimuthal angle (degree) and an x-axis 1704 that is frequency (kHz). FIG. 17B depicts a graph 1710 having a y-axis 1712 that is the azimuthal angle (degree) and an x-axis 1714 that is frequency (kHz). FIG. 17C depicts a graph 1710 having a y-axis 1722 that is the azimuthal angle (degree) and an x-axis 1724 that is frequency (kHz).

FIGS. 17A-17C show the rotated response from cross-dipole firings with a 90° channel at different direction. As shown, the 3 kHz mode is found to be sensitive to the channel direction. The maximum amplitude of the 3 kHz mode occurs when the response is rotated to point to the channel direction. Due to the symmetry of a dipole mode, another maximum energy occurs at 180° away from the true channel location. Hence the 3 kHz mode can be used to identify channel direction with a 180° ambiguity. The time domain signal used to generate FIGS. 17A-17C can be selected from different time segments (because the 3 kHz mode can be developed later in time). The time segment can be any range of time that allows for this mode to be developed.

Figures 18A, 18B, 18C:
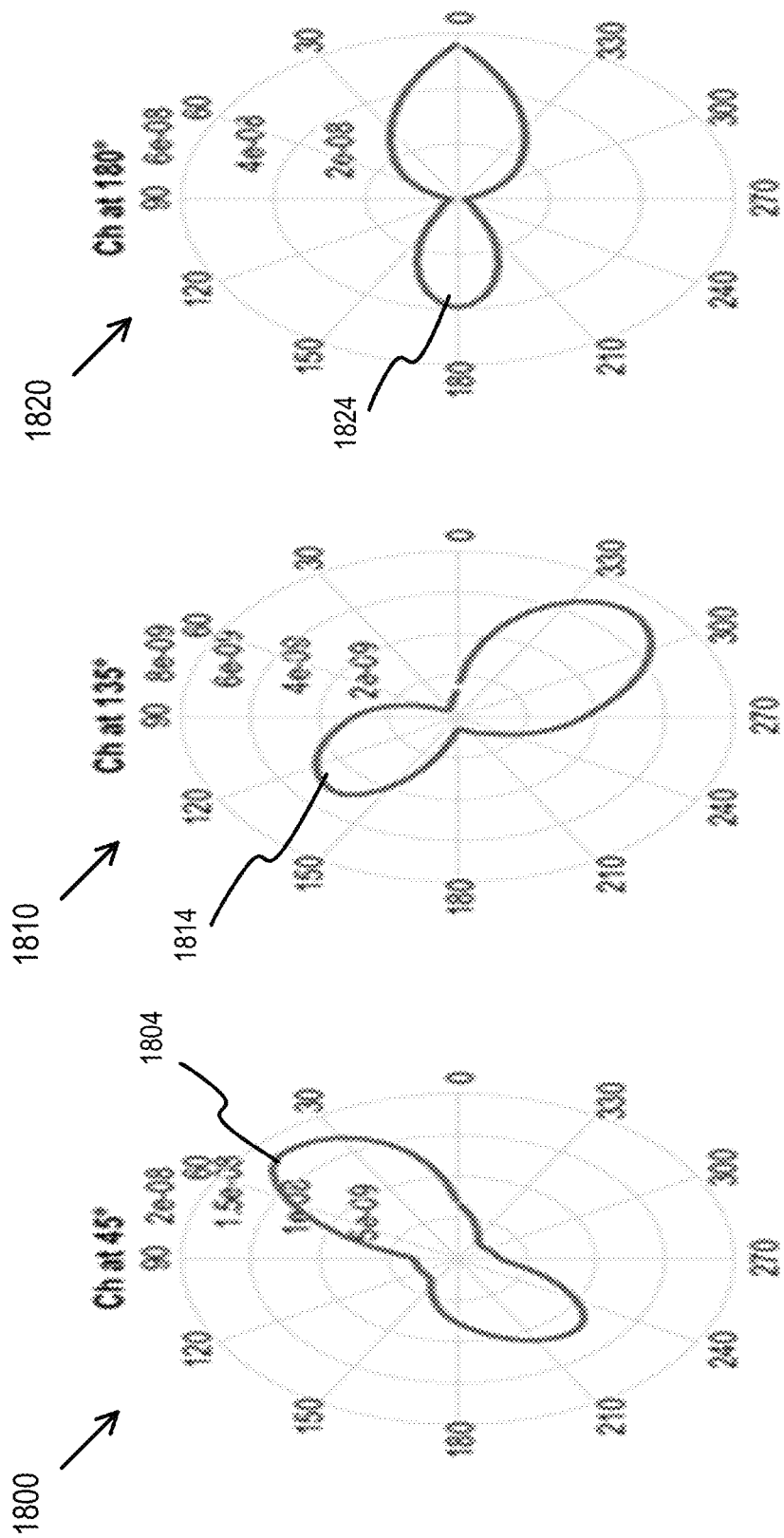
FIGS. 18A-18C depict graphs of example mode shapes computed from an azimuthal response at a 45° azimuthal location, 135° azimuthal location, and 180° azimuthal location, respectively, according to some embodiments.

Some embodiments can identify a channel location (even with eccentricity) from the mode shape of the 3 kHz mode computed from an azimuthal receiver response. To illustrate, FIGS. 18A-18C depict graphs of example mode shapes computed from an azimuthal response at a 45° azimuthal location, 135° azimuthal location, and 180° azimuthal location, respectively, according to some embodiments. FIGS. 18A-18C depict a graph 1800, a graph 1810, and a graph 1820, respectively. In the graph 1800, the channel location is at 45° based on a mode shape 1804. In the graph 1810, the channel location is at 135° based on a mode shape 1814. In the graph 1820, the channel location is at 180° based on a mode shape 1824. The radial amplitude can be computed from the frequency domain amplitude of the azimuthal receiver at the corresponding angle and at 3 kHz. The mode shape also points to the channel direction with 180° ambiguity.

Returning to the flowchart 600, operations continue at block 606.

At block 606, a time segment and a frequency range are selected based on the selected mode sensitive to the determined channel direction. For example, with reference to FIG. 2, the TTCE processor 248 can determine the time segment and the frequency range. Operations for selection of the time segment and the frequency range can be based on two inputs (an input 610 and an input 612). The input 610 includes a library of amplitude (decay) for various tubing/casing configurations, eccentricity, channel direction, etc. The input 612 includes eccentricity amplitude and direction for the given configuration. In other words, the input 612 can include how far the production tubing is from the center of the casing and its azimuthal direction.

At block 608, an amplitude (or decay) is determined based on the time segment and frequency range that is according to the selected mode. For example, with reference to FIG. 2, the TTCE processor 248 can determine the amplitude (or decay). Operations for determining the amplitude (or decay) based on the time segment and the frequency range can also be based on the two inputs (the input 610 and the input 612).

For example, with channel direction identified and a known tubing eccentricity (both eccentricity direction and offset distance from other measurement or tool), the amplitude or decay of a selected dipole mode can be computed and compared with a library to identify the channel size. The data in the library may be obtained from simulation, experiment, field data, etc. The computed amplitude or decay can be estimated based on cases extracted from the library with the same channel direction, eccentricity, tubing/casing configurations, etc.

Figure 19:
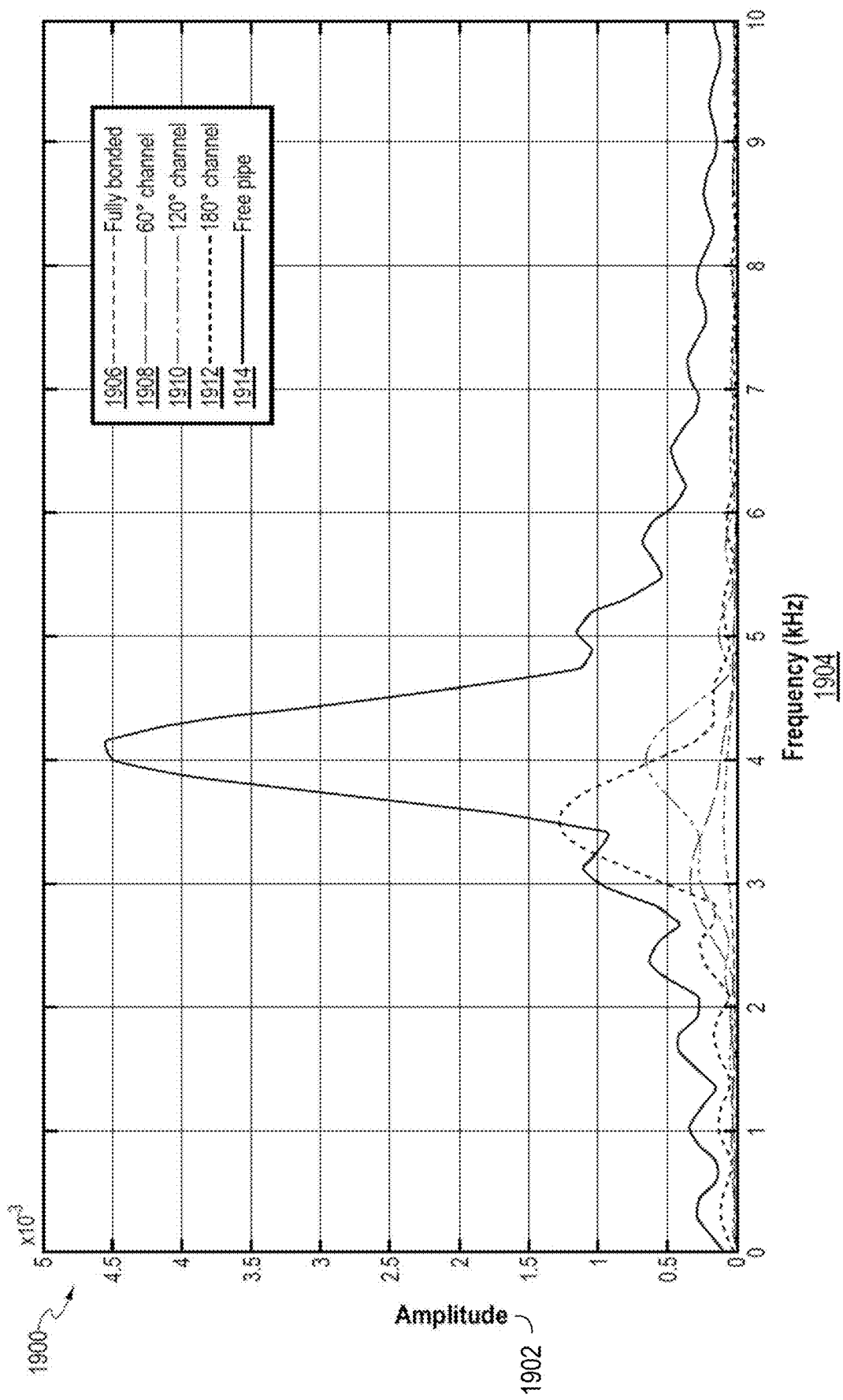
FIG. 19 depicts a graph of example frequency responses for amplitude or decay of a selected dipole mode, according to some embodiments.

To illustrate, FIG. 19 depicts a graph of example frequency responses for amplitude or decay of a selected dipole mode, according to some embodiments. In FIG. 19, a graph 1900 includes a y-axis 1902 that is the amplitude of the responses and an x-axis 1904 that is the frequency (kHz) of the responses. The graph 1900 includes five curves. A curve 1906 is the amplitude over a frequency response for a fully bonded case. A curve 1908 is the amplitude over a frequency response for a channel of 60° size. A curve 1910 is the amplitude over a frequency response for a channel of 120° size. A curve 1912 is the amplitude over a frequency response for a channel of 180° size. A curve 1914 is the amplitude over a frequency response for a free pipe case.

Figure 20:
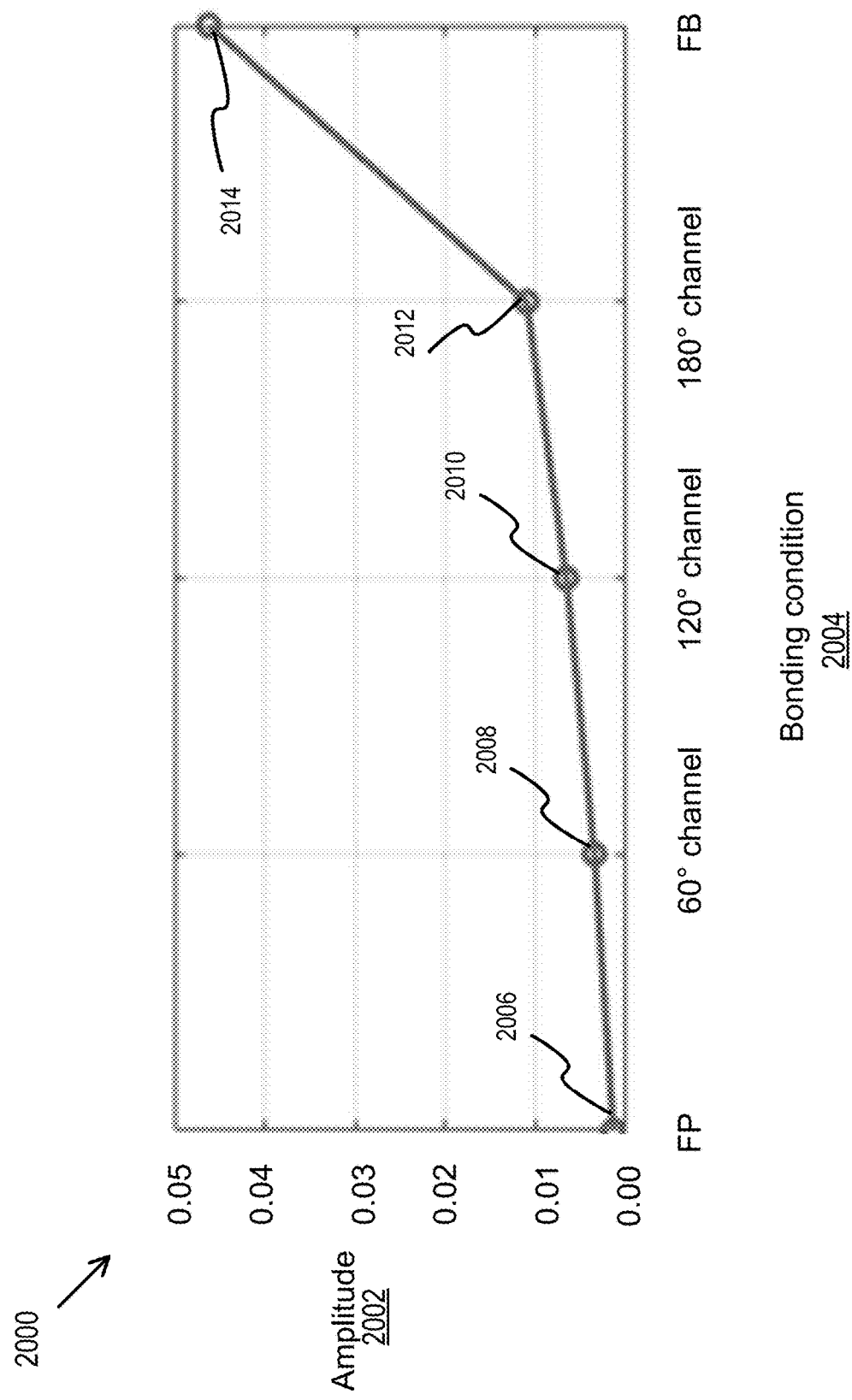
FIG. 20 depicts a graph of an example plotting of the amplitude versus the bonding condition for the frequency responses of FIG. 19, according to some embodiments.

At block 614, the cement bonding condition is evaluated based on amplitude (or decay) in comparison to a library of amplitude (or decay) for various tubing/casing configuration, eccentricity, channel direction, etc. For example, with reference to FIG. 2, the TTCE processor 248 can make this evaluation. For example, the frequency domain response can be plotted relative to the amplitude. The amplitude is computed for the mode at or near 4 kHz based on the frequency domain response. The bonding condition can then be defined relative to this amplitude. To illustrate, FIG. 20 depicts a graph of an example plotting of the amplitude versus the bonding condition for the frequency responses of FIG. 19, according to some embodiments. In FIG. 20, a graph 2000 includes a y-axis 2002 that is the amplitude of the responses and an x-axis 2004 that is the bonding condition. As shown, for a free pipe (FP) condition, the amplitude is approximately 0.00 (2006). For a channel at 60°, the amplitude is approximately 0.005 (2008). For a channel at 120°, the amplitude is approximately 0.008 (2010). For a channel at 1800°, the amplitude is approximately 0.01 (2012). For a fully (FB) condition, the amplitude is approximately 0.053 (2014). Accordingly, the bonding condition can be determine based on the amplitude of the response.

Returning to the flowchart 600, operations continue at block 616.

At block 616, a determination is made of whether a remedial action is needed based on the cement bonding condition evaluation. For example, with reference to FIG. 2, the TTCE processor 248 can make this determination. For instance, if the cement bonding condition evaluation identifies one or more fluid channels having a size greater than a threshold, the determination can be made that a remedial action is needed to correct these faults. If a remedial action is needed, operations of the flowchart 600 continue at block 618. Otherwise, operations of the flowchart 600 are complete.

At block 618, a remedial action based on the cement bonding condition evaluation is performed. For example, with reference to FIG. 2, the TTCE processor 248 can initiate such an operation. For instance, the TTCE processor 248 could initiate an operation to provide a remedial action to correct a fault (such as the cement bonding). An example of a remedial action can include different types of remedial cementing (such as squeeze cementing). Operations of the flowchart 600 are complete.

Figure 21:
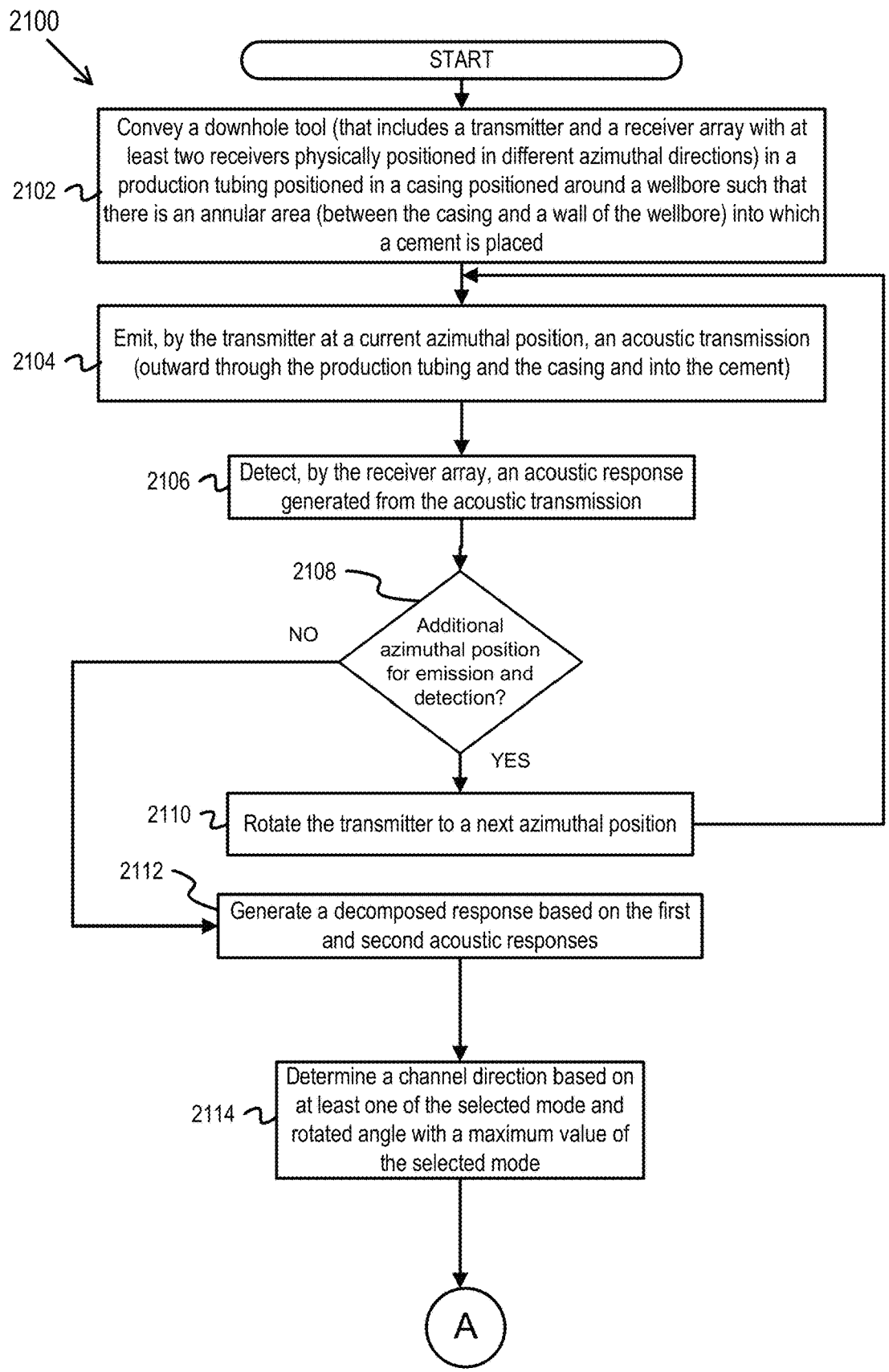
FIGS. 21-22 depict a flowchart of second example operations for performing TTCE using wellbore multi-pole resonance, according to some embodiments.
Figure 22:
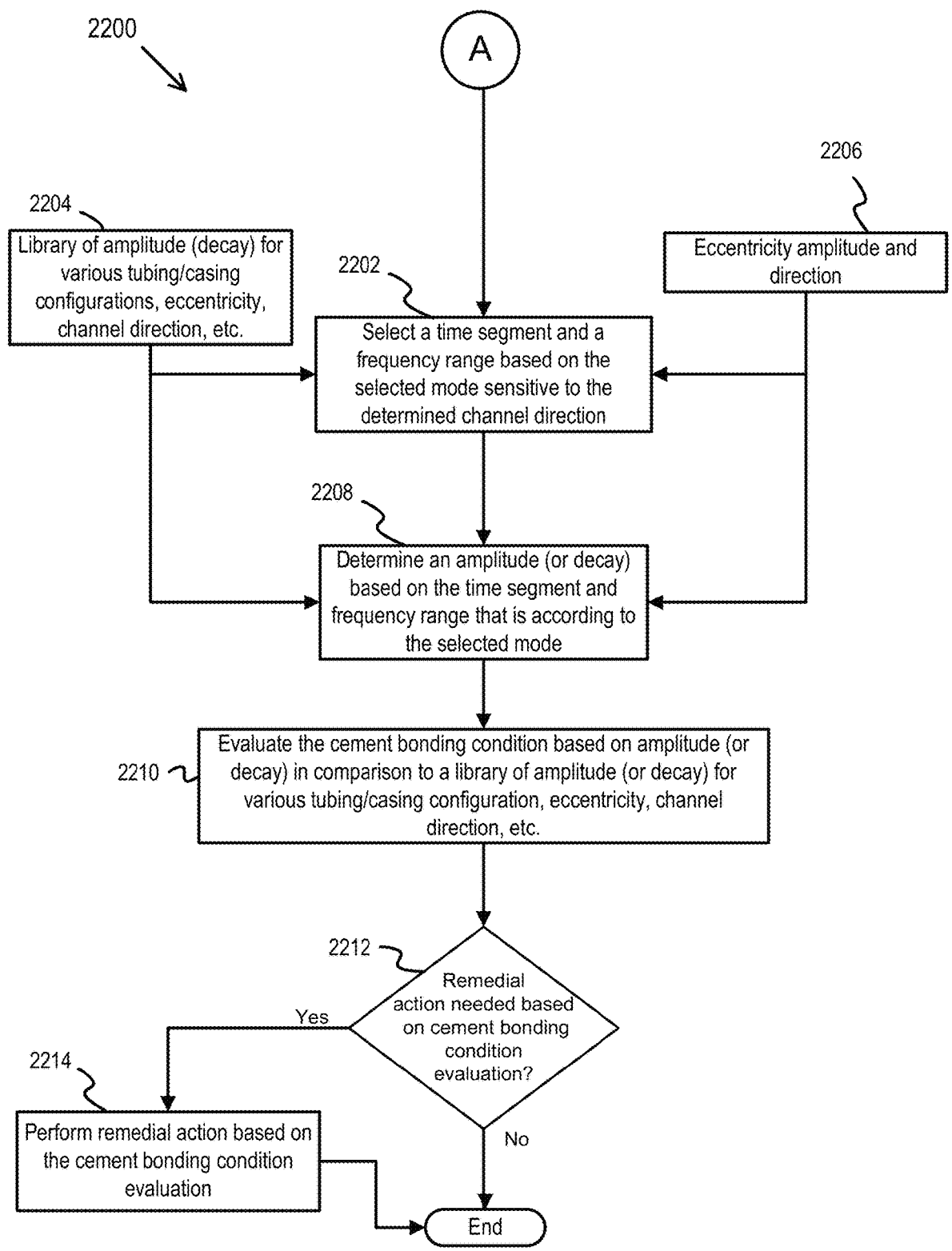

A second example of operations for performing TTCE using multi-pole resonance is now described. In contrast to the first example of operations depicted in FIGS. 5-6, the second example operations includes a rotatable transmitter to provide a multi-pole resonance. In particular, FIGS. 21-22 depict a flowchart of second example operations for performing TTCE using wellbore multi-pole resonance, according to some embodiments. FIGS. 21-22 depict a flowchart 2100 and a flowchart 2200, respectively, having operations that include a transition point A for operations to move between the flowchart 2100 and the flowchart 2200. Operations of the flowchart 2100-2200 can be performed by software, firmware, hardware or a combination thereof. Such operations are described with reference to the systems of FIGS. 1A-1B, 2, and 4. However, such operations can be performed by other systems or components. For example, at least some of the operations of the flowcharts 2100-2200 are described as being performed by a computer at a surface of the wellbore. In some embodiments, one or more of these operations can be performed by a computer at the surface and/or downhole in the wellbore. The operations of the flowchart 2100 start at block 2102.

At block 2102, a downhole tool (having a rotatable transmitter and a receiver array with at least two receivers positioned in different azimuthal positions) is conveyed in a production tubing positioned in a casing positioned around a wellbore such that there is an annular area (between the casing and a wall of the wellbore) into which cement is placed. For example, with reference to FIG. 4, the downhole tool 402 is lowered down the wellbore 401 within the production tubing 412.

At block 2104, an acoustic transmission is emitted, by a transmitter at a current azimuthal position (outward through the production tubing and the casing and into the cement). For example, with reference to FIG. 4, the transmitter 406 can emit an acoustic transmission at a current azimuthal dipole excitation outward in a first direction in the wellbore 401 outward toward through the production tubing 412 and the casing 416 and into the cement 418.

At block 2106, an acoustic response generated from the acoustic transmission is detected by the receiver array. For example, with reference to FIG. 4, one or more of the receivers 430-438 can detect an acoustic response generated from the acoustic transmission that passes through the production tubing 412 and the casing 416 and into the cement 418.

At block 2108, a determination is made of whether there is another azimuthal position from which to emit an acoustic transmission. For example, with reference to FIG. 2, the logging controller 250 can make this determination. For instance, the TTCE operations may be configured such that emission and detection may be performed at N number of different azimuthal positions. Accordingly, the logging controller 250 can determine whether emission and detection has occurred at each of the N number of azimuthal positions. If there is another azimuthal position from which to emit an acoustic transmission, operations of the flowchart 2100 continue at block 2110. Otherwise, operations of the flowchart 2100 continue at block 2112.

At block 2110, the transmitter is rotated to a next azimuthal position. For example, with reference to FIG. 2, the logging controller 250 can control rotation of the transmitter. For example, with reference to FIG. 4, the transmitter 406 is rotated to the next azimuthal position for emission of a next acoustic transmission. Operations of the flowchart 2100 return to block 2104.

At block 2112, a decomposed response is generated from the acoustic responses. For example, with reference to FIG. 2, the TTCE processor 248 can generate the decomposed response (similar to the operations at block 602 in the flowchart 600 of FIG. 6 described above).

At block 2114, a channel direction is determined based on at least one of the selected mode and rotated angle with a maximum value of the selected mode. For example, with reference to FIG. 2, the TTCE processor 248 can determine the channel direction (similar to the operations at block 604 in the flowchart 600 of FIG. 6 described above). Operations of the flowchart 2100 continue at transition point A, which continues at transition point A of the flowchart 2200 of FIG. 22.

From transition point A of the flowchart 2200 of FIG. 22, operations continue at block 2202.

At block 2202, a time segment and a frequency range are selected based on the selected mode sensitive to the determined channel direction. For example, with reference to FIG. 2, the TTCE processor 248 can determine the time segment and the frequency range. Operations for selection of the time segment and the frequency range can be based on two inputs (an input 2204 and an input 2206). The input 2204 includes a library of amplitude (decay) for various tubing/casing configurations, eccentricity, channel direction, etc. The input 2206 includes eccentricity amplitude and direction for the given configuration. In other words, the input 2206 can include how far the production tubing is from the center of the casing and its azimuthal direction. Operations for selection of the time segment and frequency range can be similar to the operations at block 606 in the flowchart 600 of FIG. 6 described above).

At block 2208, an amplitude (or decay) is determined based on the time segment and frequency range that is according to the selected mode. For example, with reference to FIG. 2, the TTCE processor 248 can determine the amplitude (or decay). Operations for determining the amplitude (or decay) based on the time segment and the frequency range can also be based on the two inputs (the input 2204 and the input 2206). Operations for determining the amplitude (or decay) can be similar to the operations at block 608 in the flowchart 600 of FIG. 6 described above).

At block 2210, the cement bonding condition is evaluated based on amplitude (or decay) in comparison to a library of amplitude (or decay) for various tubing/casing configuration, eccentricity, channel direction, etc. For example, with reference to FIG. 2, the TTCE processor 248 can make this evaluation (similar to the operations at block 614 in the flowchart 600 of FIG. 6 described above).

At block 2212, a determination is made of whether a remedial action is needed based on the cement bonding condition evaluation. For example, with reference to FIG. 2, the TTCE processor 248 can make this determination. For instance, if the cement bonding condition evaluation identifies one or more fluid channels having a size greater than a threshold, the determination can be made that a remedial action is needed to correct these faults. If a remedial action is needed, operations of the flowchart 2200 continue at block 2210. Otherwise, operations of the flowchart 2200 are complete.

At block 2214, a remedial action based on the cement bonding condition evaluation is performed. For example, with reference to FIG. 2, the TTCE processor 248 can initiate such an operation. For instance, the TTCE processor 248 could initiate an operation to provide a remedial action to correct a fault in the cement (such as the cement bonding). An example of a remedial action can include different types of remedial cementing (such as squeeze cementing). Operations of the flowchart 2200 are complete.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a computer or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing. The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Example Computer

Figure 23:
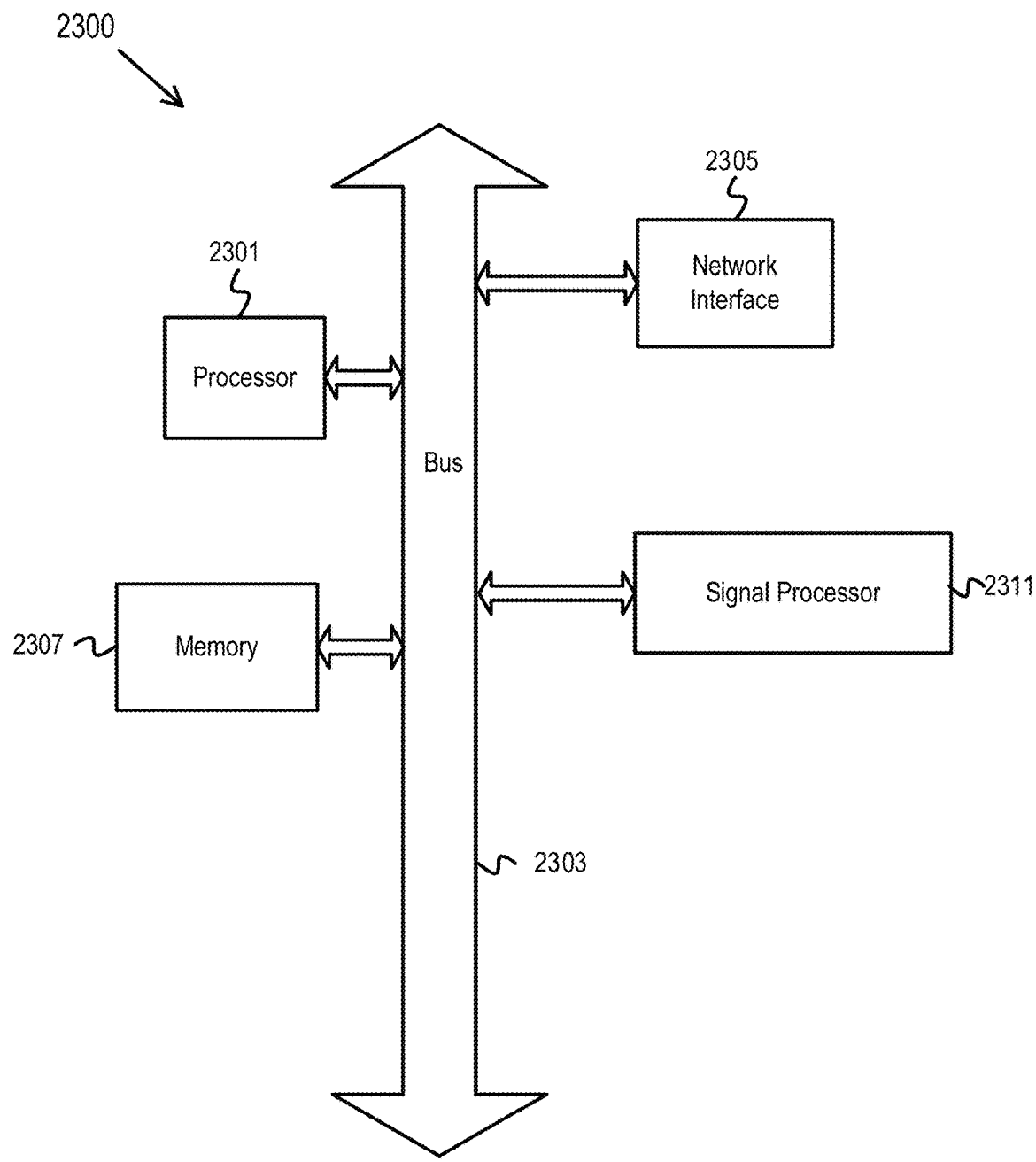
FIG. 23 depicts an example computer, according to some embodiments.

FIG. 23 depicts an example computer, according to some embodiments. A computer 2300 system includes a processor 2301 (possibly including multiple processors, multiple cores, multiple nodes, and/or implementing multi-threading, etc.). The computer 2300 includes a memory 2307. The memory 2307 may be system memory or any one or more of the above already described possible realizations of machine-readable media. The computer 2300 also includes a bus 2303 and a network interface 2305. The computer 2300 can communicate via transmissions to and/or from remote devices via the network interface 2305 in accordance with a network protocol corresponding to the type of network interface, whether wired or wireless and depending upon the carrying medium. In addition, a communication or transmission can involve other layers of a communication protocol and or communication protocol suites (e.g., transmission control protocol, Internet Protocol, user datagram protocol, virtual private network protocols, etc.).

The computer 2300 also includes a signal processor 2311 that can perform at least some of the operations described herein. Any one of the previously described functionalities may be partially (or entirely) implemented in hardware and/or on the processor 2301. For example, the functionality may be implemented with an application specific integrated circuit, in logic implemented in the processor 2301, in a co-processor on a peripheral device or card, etc. Further, realizations may include fewer or additional components not illustrated in FIG. 23 (e.g., video cards, audio cards, additional network interfaces, peripheral devices, etc.). The processor 2301 and the network interface 2305 are coupled to the bus 2303. Although illustrated as being coupled to the bus 2303, the memory 2307 may be coupled to the processor 2301.

While the aspects of the disclosure are described with reference to various implementations and exploitations, it will be understood that these aspects are illustrative and that the scope of the claims is not limited to them. In general, techniques for cement bonding condition evaluation as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

EXAMPLE EMBODIMENTS

Embodiment #1: A method comprising: conveying a downhole tool in a tubing that is positioned in a casing that is positioned to form an annulus between the casing and a wall of a wellbore formed in a subsurface formation, wherein a cement with unknown bonding condition exists in the annulus, wherein the downhole tool includes at least one transmitter configured to emit an acoustic transmission at different azimuthal positions, and wherein the downhole tool includes a receiver array that includes at least two receivers physically positioned in different azimuthal directions; emitting, from the at least one transmitter, a first acoustic transmission in a first azimuthal direction and outward to the cement such that at least a portion of the first acoustic transmission is to penetrate the cement; detecting, by the receiver array, a first acoustic response that is derived from the first acoustic transmission; emitting, from the at least one transmitter, a second acoustic transmission in a second azimuthal direction and outward to the cement such that at least a portion of the second acoustic transmission is to penetrate the cement, wherein the second azimuthal direction is orthogonal to the first azimuthal direction; detecting, by the receiver array, a second acoustic response that is derived from the second acoustic transmission; determining a dipole wellbore resonance based on the first acoustic response and the second acoustic response; and evaluating a property of the cement based on the dipole wellbore resonance.

Embodiment #2: The method of claim 1, further comprising: rotating the at least one transmitter from the first azimuthal direction to the second azimuthal direction, after emitting the first acoustic transmission and before emitting the second acoustic transmission.

Embodiment #3: The method of any one of claims 1-2, further comprising: generating a decomposed response based on the first acoustic response and the second acoustic response, wherein determining the dipole wellbore resonance comprises: determining an azimuthal direction where a channel is located in the cement; selecting at least one of a time segment and a frequency range of decomposed response based on the azimuthal direction where the channel is located in the cement; and evaluating the property of the cement based on the selected at least one of the time segment and the frequency range.

Embodiment #4: The method of claim 3, wherein determining the dipole wellbore resonance comprises: determining an amplitude of a mode of the decomposed response based on the at least one of the time segment and the frequency range; comparing the determined amplitude of the mode to a library of amplitudes for different tubing and casing configurations, eccentricities, and channel directions; and evaluating the property of the cement based on the comparing.

Embodiment #5: The method of any one of claims 1-4, further comprising: determining an eccentricity of the tubing that defines an offset of a position of the tubing from the center of the wellbore, wherein determining the dipole wellbore resonance comprises determining the dipole wellbore resonance based on the eccentricity.

Embodiment #6: The method of any one of claims 1-5, wherein evaluating the property of the cement comprises evaluating a bonding condition of the cement.

Embodiment #7: The method of claim 6, wherein evaluating the bonding condition of the cement comprises determining whether the bonding condition is at least one of a fully bonded condition, a free pipe condition, and a partially bonded condition.

Embodiment #8: The method of any one of claims 1-7, further comprising performing a remedial action to correct a fault in the cement based on the evaluating the property of the cement.

Embodiment #9: A system comprising: a downhole tool to be conveyed in a tubing that is positioned in a casing that is positioned to form an annulus between the casing and a wall of a wellbore formed in a subsurface formation, wherein a cement has been placed in the annulus, wherein the downhole tool comprises, at least one transmitter configured to, emit a first acoustic transmission in a first azimuthal direction and outward to the cement such that at least a portion of the first acoustic transmission is to penetrate the cement; and emit a second acoustic transmission in a second azimuthal direction and outward to the cement such that at least a portion of the second acoustic transmission is to penetrate the cement, wherein the second azimuthal direction is orthogonal to the first azimuthal direction; a receiver array that includes at least two receivers physically positioned in different azimuthal directions, wherein the receiver array is configured to, detect a first acoustic response that is derived from the first acoustic transmission; and detect a second acoustic response that is derived from the second acoustic transmission; a processor; and a machine-readable medium having program code executable by the processor to cause the processor to, determine a dipole wellbore resonance based on the first acoustic response and the second acoustic response; and evaluate a property of the cement based on the dipole wellbore resonance.

Embodiment #10: The system of claim 9, wherein the at least one transmitter is to rotate from the first azimuthal direction to the second azimuthal direction, after emission of the first acoustic transmission and before emission of the second acoustic transmission.

Embodiment #11: The system of any one of claims 9-10, wherein the program code comprises program code executable by the processor to cause the processor to, generate a decomposed response based on the first acoustic response and the second acoustic response, wherein the program code executable by the processor to cause the processor to determine the dipole wellbore resonance comprises program code executable by the processor to cause the processor to, determine an azimuthal direction where a channel is located in the cement; select at least one of a time segment and a frequency range of decomposed response based on the azimuthal direction where the channel is located in the cement; and evaluate the property of the cement based on the selected at least one of the time segment and the frequency range.

Embodiment #12: The system of claim 11, wherein the program code executable by the processor to cause the processor to determine the dipole wellbore resonance comprises program code executable by the processor to cause the processor to, determine an amplitude of a mode of the decomposed response based on the at least one of the time segment and the frequency range; compare the determined amplitude of the mode to a library of amplitudes for different tubing and casing configurations, eccentricities, and channel directions; and evaluate the property of the cement based on the comparing.

Embodiment #13: The system of any one of claims 9-12, wherein the program code comprises program code executable by the processor to cause the processor to, determine an eccentricity of the tubing that defines an offset of a position of the tubing from the center of the wellbore, wherein the program code executable by the processor to cause the processor to determine the dipole wellbore resonance comprises program code executable by the processor to cause the processor to determine the dipole wellbore resonance based on the eccentricity.

Embodiment #14: The system of any one of claims 9-13, wherein the program code executable by the processor to cause the processor to evaluate the property of the cement comprises program code executable by the processor to cause the processor to evaluate a bonding condition of the cement.

Embodiment #15: The system of claim 14, wherein the program code executable by the processor to cause the processor to evaluate the property of the cement comprises program code executable by the processor to cause the processor to determine whether the bonding condition is at least one of a fully bonded condition, a free pipe condition, and a partially bonded condition.

Embodiment #16: The system of any one of claims 9-15, wherein the program code comprises program code executable by the processor to cause the processor to perform a remedial action to correct a fault in the cement based on the evaluation of the property of the cement.

Embodiment #17: One or more non-transitory machine-readable media comprising program code executable by a processor to cause the processor to: receive a first acoustic response, that is detected by a receiver array that includes at least two receivers physically positioned in different azimuthal directions, wherein the receiver array is mounted on a downhole tool that is positioned in a tubing that is positioned in a casing this is located in a wellbore such that an annulus is defined between the casing and a wall of the wellbore, wherein a cement is located within the annulus, wherein the first acoustic response is derived from a first acoustic transmission emitted from at least one transmitter mounted on the downhole tool; receive a second acoustic response that is detected by the receiver array, wherein the first acoustic response is derived from a second acoustic transmission emitted from the at least one transmitter determine a dipole wellbore resonance based on the first acoustic response and the second acoustic response; and evaluate a property of the cement based on the dipole wellbore resonance.

Embodiment #18: The one or more non-transitory machine-readable media of claim 17, wherein the program code comprises program code executable by the processor to cause the processor to, generate a decomposed response based on the first acoustic response and the second acoustic response, wherein the program code executable by the processor to cause the processor to determine the dipole wellbore resonance comprises program code executable by the processor to cause the processor to, determine an azimuthal direction where a channel is located in the cement; select at least one of a time segment and a frequency range of decomposed response based on the azimuthal direction where the channel is located in the cement; and evaluate the property of the cement based on the selected at least one of the time segment and the frequency range.

Embodiment #19: The one or more non-transitory machine-readable media of claim 18, wherein the program code executable by the processor to cause the processor to determine the dipole wellbore resonance comprises program code executable by the processor to cause the processor to, determine an amplitude of a mode of the decomposed response based on the at least one of the time segment and the frequency range; compare the determined amplitude of the mode to a library of amplitudes for different tubing and casing configurations, eccentricities, and channel directions; and evaluate the property of the cement based on the comparing.

Embodiment #20: The one or more non-transitory machine-readable media of any one of claims 17-19, wherein the program code comprises program code executable by the processor to cause the processor to, determine an eccentricity of the tubing that defines an offset of a position of the tubing from the center of the wellbore, wherein the program code executable by the processor to cause the processor to determine the dipole wellbore resonance comprises program code executable by the processor to cause the processor to determine the dipole wellbore resonance based on the eccentricity.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
conveying a downhole tool in a tubing that is positioned in a casing that is positioned to form an annulus between the casing and a wall of a wellbore formed in a subsurface formation, wherein a cement with unknown bonding condition exists in the annulus, wherein the downhole tool includes at least one transmitter configured to emit an acoustic transmission at different azimuthal positions, and wherein the downhole tool includes a receiver array that includes at least two receivers physically positioned in different azimuthal directions;
emitting, from the at least one transmitter, a first acoustic transmission in a first azimuthal direction to the cement such that at least a portion of the first acoustic transmission is to penetrate the cement;
detecting, by the at least two receivers of the receiver array, a first acoustic response that is derived from the first acoustic transmission;
emitting, from the at least one transmitter, a second acoustic transmission in the second azimuthal direction to the cement such that at least a portion of the second acoustic transmission is to penetrate the cement;
detecting, by the at least two receivers of the receiver array, a second acoustic response that is derived from the second acoustic transmission;
determining a dipole wellbore resonance based on the first acoustic response and the second acoustic response the dipole wellbore resonance including late time arrivals;
converting a first time segment of the late time arrivals into amplitude measurements in the frequency domain at different azimuthal angles;
determining a channel direction based on the amplitude measurements in the frequency domain at the different azimuthal angles; and
evaluating a property of the cement based on the dipole wellbore resonance, wherein evaluating includes determining a bonding condition of the cement in the channel direction, wherein determining a bonding condition of the cement in the channel direction includes:
selecting a second time segment of the late time arrivals, the second time segment associated with a frequency sensitive to cement bonding;
converting the second time segment of the late time arrivals into amplitude measurements in the frequency domain; and
evaluating the bonding condition of the cement in the channel direction based on the amplitude measurements of the second time segment of the late time arrivals in the frequency domain.

2. The method of claim 1, further comprising:
rotating the at least one transmitter from the first azimuthal direction to the second azimuthal direction, after emitting the first acoustic transmission and before emitting the second acoustic transmission.

3. The method of claim 1, wherein evaluating the bonding condition of the cement in the channel direction comprises:
selecting one or more of the amplitude measurements of the second time segment in the frequency domain, wherein selecting includes selecting amplitude measurements associated with bonding condition;
comparing the selected one or more amplitude measurements to a library of amplitudes for different tubing and casing configurations, eccentricities, and channel directions; and
evaluating the property of the cement based on the comparing.

4. The method of claim 1, wherein evaluating the property of the cement further includes evaluating a bonding condition of the cement based on amplitude and frequency characteristics of the one or more late time arrivals.

5. The method of claim 4, wherein evaluating the bonding condition of the cement comprises determining whether the bonding condition is at least one of a fully bonded condition, a free pipe condition, and a partially bonded condition.

6. The method of claim 1, further comprising performing a remedial action to correct a fault in the cement based on the evaluating the property of the cement.

7. The method of claim 1, wherein converting the second time segment of the late time arrivals into amplitude measurements in the frequency domain includes transforming the second time segment of the late time arrivals into the frequency domain and evaluating a bonding condition of the cement based on the characteristics of the one or more late time arrivals in the frequency domain.

8. A system comprising:
a downhole tool to be conveyed in a tubing that is positioned in a casing that is positioned to form an annulus between the casing and a wall of a wellbore formed in a subsurface formation, wherein a cement has been placed in the annulus, wherein the downhole tool comprises,
at least one transmitter configured to,
emit a first acoustic transmission in a first azimuthal direction to the cement such that at least a portion of the first acoustic transmission is to penetrate the cement; and
emit a second acoustic transmission in a second azimuthal direction to the cement such that at least a portion of the second acoustic transmission is to penetrate the cement, wherein the second azimuthal direction is orthogonal to the first azimuthal direction;
a receiver array that includes at least two receivers physically positioned in different azimuthal directions, wherein the receiver array is configured to,
detect, at the at least two receivers, a first acoustic response that is derived from the first acoustic transmission; and
detect, at the at least two receivers, a second acoustic response that is derived from the second acoustic transmission;
a processor; and
a machine-readable medium having program code executable by the processor to cause the processor to,
determine a dipole wellbore resonance based on the first acoustic response and the second acoustic response, the dipole wellbore response including late time arrivals;
convert a first time segment of the late time arrivals into amplitude measurements in the frequency domain at different azimuthal angles;
determine a channel direction based on the amplitude measurements in the frequency domain at the different azimuthal angles; and
evaluate a property of the cement based on the dipole wellbore resonance, wherein evaluating includes determining a bonding condition of the cement in the channel direction, wherein determining a bonding condition of the cement in the channel direction includes:

selecting a second time segment of the late time arrivals, the second time segment associated with a frequency sensitive to cement bonding;

converting the second time segment of the late time arrivals into amplitude measurements in the frequency domain; and evaluating the bonding condition of the cement in the channel direction based on the amplitude measurements of the second time segment of the late time arrivals in the frequency domain.

9. The system of claim 8, wherein the at least one transmitter is to rotate from the first azimuthal direction to the second azimuthal direction, after emission of the first acoustic transmission and before emission of the second acoustic transmission.

10. The system of claim 8, wherein the program code executable by the processor to cause the processor to evaluate the bonding condition of the cement in the channel direction comprises program code executable by the processor to cause the processor to, select one or more of the amplitude measurements of the second time segment in the frequency domain, wherein selecting includes selecting amplitude measurements associated with bonding condition;

compare the selected one or more amplitude measurements to a library of amplitudes for different tubing and casing configurations, eccentricities, and channel directions; and evaluate the property of the cement based on the comparing.

11. The system of claim 8, wherein the program code executable by the processor to cause the processor to evaluate the property of the cement comprises program code executable by the processor to cause the processor to evaluate a bonding condition of the cement based on amplitude and frequency characteristics of the one or more late time arrivals.

12. The system of claim 11, wherein the program code executable by the processor to cause the processor to evaluate the property of the cement comprises program code executable by the processor to cause the processor to determine whether the bonding condition is at least one of a fully bonded condition, a free pipe condition, and a partially bonded condition.

13. The system of claim 8, wherein the program code comprises program code executable by the processor to cause the processor to perform a remedial action to correct a fault in the cement based on the evaluation of the property of the cement.

14. The system of claim 8, wherein converting the second time segment of the late time arrivals into amplitude measurements in the frequency domain includes transforming the second time segment of the late time arrivals into the frequency domain and evaluating a bonding condition of the cement based on the characteristics of the one or more late time arrivals in the frequency domain.

15. One or more non-transitory machine-readable media comprising program code executable by a processor to cause the processor to:

receive, by at least two receivers of a receiver array, a first acoustic response, the at least two receivers physically positioned in different azimuthal directions, wherein the receiver array is mounted on a downhole tool that is positioned in a tubing that is positioned in a casing this is located in a wellbore such that an annulus is defined between the casing and a wall of the wellbore, wherein a cement is located within the annulus, wherein the first acoustic response is derived from a first acoustic transmission emitted from at least one transmitter mounted on the downhole tool;

receive, by the at least two receivers of the receiver array, a second acoustic response, wherein the second acoustic response is derived from a second acoustic transmission emitted from the at least one transmitter;

determine a dipole wellbore resonance based on the first acoustic response and the second acoustic response, the dipole wellbore resonance including late time arrivals;

converting a first time segment of the late time arrivals into amplitude measurements in the frequency domain at different azimuthal angles;

determining a channel direction based on the amplitude measurements in the frequency domain at the different azimuthal angles; and evaluate a property of the cement based on the dipole wellbore resonance, wherein evaluating includes determining a bonding condition of the cement in the channel direction, wherein determining a bonding condition of the cement in the channel direction includes:

selecting a second time segment of the late time arrivals, the second time segment associated with a frequency sensitive to cement bonding;

converting the second time segment of the late time arrivals into amplitude measurements in the frequency domain; and evaluating the bonding condition of the cement in the channel direction based on the amplitude measurements of the second time segment of the late time arrivals in the frequency domain.

16. The one or more non-transitory machine-readable media of claim 15, wherein the program code executable by the processor to cause the processor to evaluate the bonding condition of the cement in the channel direction comprises program code executable by the processor to cause the processor to, select one or more of the amplitude measurements of the second time segment in the frequency domain, wherein selecting includes selecting amplitude measurements associated with the bonding condition;

compare the selected one or more amplitude measurements to a library of amplitudes for different tubing and casing configurations, eccentricities, and channel directions; and evaluate the property of the cement based on the comparing.

17. The one or more non-transitory machine-readable media of claim 15, wherein converting the second time segment of the late time arrivals into amplitude measurements in the frequency domain includes transforming the second time segment of the late time arrivals into the frequency domain and evaluating a bonding condition of the cement based on the characteristics of the one or more late time arrivals in the frequency domain.

* * * * *